(12) United States Patent
Hancock et al.

(10) Patent No.: US 10,495,317 B1
(45) Date of Patent: Dec. 3, 2019

(54) DUAL-FUEL SOURCE COOKING DEVICES

(71) Applicants: Jeffrey D. Hancock, Uintah, UT (US); Christopher N. Schenck, Uintah, UT (US)

(72) Inventors: Jeffrey D. Hancock, Uintah, UT (US); Christopher N. Schenck, Uintah, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

(21) Appl. No.: 16/195,647

(22) Filed: Nov. 19, 2018

(51) Int. Cl.
*A47J 37/07* (2006.01)
*F24C 11/00* (2006.01)

(52) U.S. Cl.
CPC .......... *F24C 11/00* (2013.01); *A47J 37/0713* (2013.01); *A47J 37/0786* (2013.01)

(58) Field of Classification Search
CPC ....... F24C 11/00; F24C 15/18; A47J 37/0713; A47J 37/0786; A47J 37/074; A47J 37/079; A47J 37/0682
USPC .......... 126/1 R, 25 R, 2, 15 R, 1 A; 99/339, 99/374, 448, 292
See application file for complete search history.

(56) References Cited

U.S. PATENT DOCUMENTS

| | | | |
|---|---|---|---|
| 652,531 A * | 6/1900 | Carlson | A23B 4/052 99/482 |
| 2,444,985 A * | 7/1948 | Fulton | F23B 1/32 110/275 |
| 3,541,947 A * | 11/1970 | Anderson | A47J 27/04 219/401 |
| 4,823,684 A * | 4/1989 | Traeger | A47J 37/0704 126/10 |
| 5,163,358 A * | 11/1992 | Hanagan | A47J 37/0713 126/25 R |
| 5,429,110 A * | 7/1995 | Burke | A47J 37/0704 110/110 |
| 6,065,464 A | 5/2000 | Zajec | |
| 6,189,528 B1 | 2/2001 | Oliver | |
| 6,223,737 B1 * | 5/2001 | Buckner | F23B 1/38 110/108 |
| 6,595,197 B1 * | 7/2003 | Ganard | A47J 37/0704 126/1 D |
| 6,681,759 B2 * | 1/2004 | Bentulan | A47J 37/0704 126/25 R |

(Continued)

*Primary Examiner* — Jimmy Chou
(74) *Attorney, Agent, or Firm* — Maschoff Brennan

(57) ABSTRACT

A cooking device includes a housing assembly, a first heat source, a second heat source, a first heat control system, and a second heat control system. The housing assembly defines two cooking volumes adjacent to one another. A first cooking volume has a first portion of the cooking structure and a second cooking volume has a second portion of the cooking structure. The first heat source is disposed in the first cooking volume and provides thermal energy directly to the first portion of the cooking structure. The second heat source is disposed in the second cooking volume and occluded from the second portion of the cooking structure to provide thermal energy indirectly to the second portion of the cooking structure. The cooking volumes operate independently and cooperatively to allow for selective cooking of a foodstuff on the first portion of the cooking structure or the second cooking structure with both direct thermal energy from the first heat source and indirect thermal energy from the second heat source.

19 Claims, 17 Drawing Sheets

(56) References Cited

U.S. PATENT DOCUMENTS

| | | | |
|---|---|---|---|
| D491,410 S * | 6/2004 | Saunders | D7/334 |
| 7,793,649 B2 * | 9/2010 | Barkhouse | F23N 1/002 |
| | | | 126/39 G |
| 7,900,553 B1 * | 3/2011 | Maurin | A47J 37/0704 |
| | | | 99/339 |
| D636,217 S * | 4/2011 | Slater | D7/334 |
| 8,381,712 B1 * | 2/2013 | Simms, II | F24C 3/14 |
| | | | 126/2 |
| 8,573,504 B1 * | 11/2013 | Lee | F23K 3/02 |
| | | | 110/190 |
| 8,726,896 B2 | 5/2014 | Guillory et al. | |
| 8,839,780 B1 * | 9/2014 | Bennett | G06Q 10/08 |
| | | | 126/25 R |
| 8,936,017 B2 | 1/2015 | Baggott | |
| D736,026 S * | 8/2015 | Kam | D7/334 |
| 10,201,247 B1 * | 2/2019 | Jones | A47J 37/07 |
| 10,213,051 B2 * | 2/2019 | Colston | A47J 37/0623 |
| 2002/0189462 A1 * | 12/2002 | Guess | A47J 27/62 |
| | | | 99/326 |
| 2008/0098902 A1 * | 5/2008 | Mansfield | A47J 37/0786 |
| | | | 99/339 |
| 2009/0013985 A1 * | 1/2009 | Little | F24B 1/024 |
| | | | 126/67 |
| 2010/0083947 A1 * | 4/2010 | Guillory | A47J 37/0704 |
| | | | 126/25 R |
| 2012/0288596 A1 * | 11/2012 | Holdo Baggott | A47J 37/0704 |
| | | | 426/235 |
| 2013/0206132 A1 * | 8/2013 | Simms, II | A47J 37/0763 |
| | | | 126/25 R |
| 2013/0312732 A1 * | 11/2013 | Brennan | A47J 37/07 |
| | | | 126/25 R |
| 2014/0130788 A1 * | 5/2014 | Contarino, Jr. | A47J 37/0786 |
| | | | 126/25 R |
| 2015/0164278 A1 * | 6/2015 | Kohler | A47J 37/0623 |
| | | | 99/340 |

\* cited by examiner

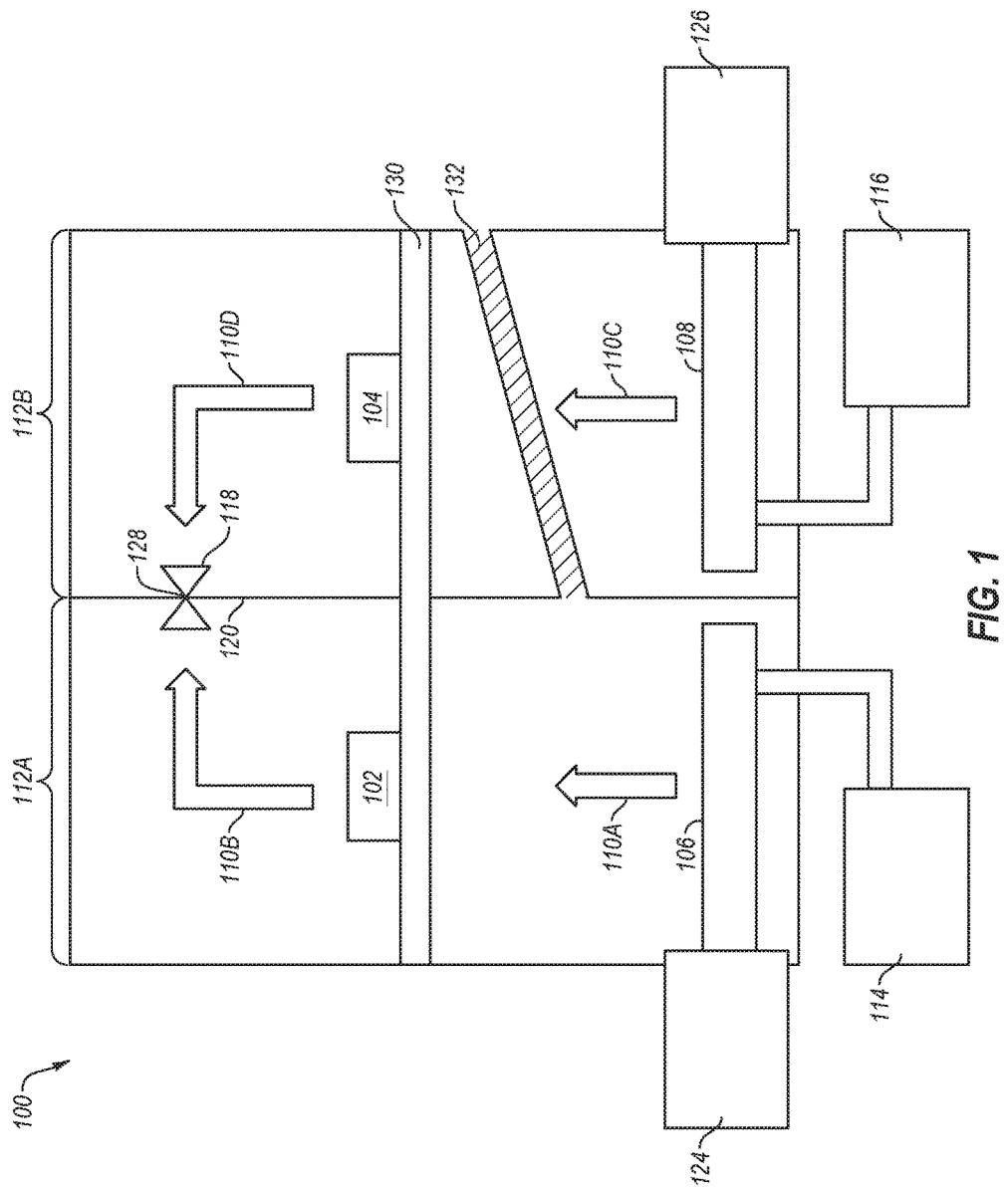

US 10,495,317 B1

DUAL-FUEL SOURCE COOKING DEVICES

BACKGROUND OF THE INVENTION

Field of the Invention

The present invention generally relates to cooking devices, in particular, some embodiments of the present disclosure relate to dual-fuel source cooking devices.

Description of Related Art

Many different types of cooking devices are well known and used for a variety of different purposes. For example, some cooking devices may be implemented to cook foodstuffs in an outdoor environment such as a park, a yard, while camping, etc. The outdoor cooking devices generally combust a particular type of fuel to generate thermal energy, which is used to cook the foodstuffs. Examples of the types of fuel include propane gas, natural gas, charcoal, wood, etc. Most cooking devices are configured to burn a single type of fuel. For instance, charcoal grills are generally constructed with areas for charcoal briquettes and provide an access to remove the briquettes following use.

Additionally, some cooking devices may be configured for multiple types of fuels. However, the dual-fuel or multi-fuel type cooking devices are often comprised of single-fuel type cooking devices manufactured into a single device. For instance, an example of a duel-fuel cooking device may include a gas grill that is positioned next to a charcoal grill and manufactured into a single device. Such configurations are generally large compared to single-fuel type cooking devices and do not improve the functionality of the cooking device. Instead, these merely provide a fuel option. Moreover, these duel-fuel type cooking devices often include multiple separate cooking volumes with multiple separate cooking structures. Accordingly, these duel-fuel type cooking devices are not well suited for a cooking operation involving multiple fuel types or involve the movement of foodstuffs between the separate cooking volumes during use.

The subject matter claimed herein is not limited to embodiments that solve any disadvantages or that operate only in environments such as those described. Rather, this background is only provided to illustrate one example technology area where some embodiments described herein may be practiced.

BRIEF SUMMARY OF EMBODIMENTS OF THE INVENTION

A need therefore exists for a cooking device that eliminates or diminishes the disadvantages and problems described above.

An aspect of the invention includes a cooking device that includes components such as a housing assembly, a first heat source, a second heat source, a first heat control system, a separator, a vent assembly, a positioning mechanism, a wood pellet reservoir, and a second heat control system. The housing assembly may define two cooking volumes, which may be selectively independent. The cooking volumes may be positioned adjacent to one another. For instance, the cooking volumes may be in a side-by-side arrangement or another suitable arrangement. A first cooking volume may have a first portion of the cooking structure, which may be arranged for foodstuff placement. The second cooking volume may include a second portion of the cooking structure, which may be arranged for foodstuff placement. The first heat source may be disposed in the first cooking volume and may be positioned relative to the first portion of the cooking structure to provide thermal energy directly to the first portion of the cooking structure. The second heat source may be disposed in the second cooking volume and may be occluded from the second portion of the cooking structure such that the second heat source is configured to provide thermal energy indirectly to the second portion of the cooking structure. The second heat source is a different type than the first heat source. The first heat source may include a low-pressure gas grill or another direct cooking device. The second heat source may include a wood pellet burner or another indirect cooking device. The first heat control system may be configured to control the first heat source. The second heat control system may be configured to control the second heat source. The two cooking volumes may be configured for multiple operations. For instance, the cooking volumes may be configured to operate both independently and cooperatively, which may allow for selective cooking of a foodstuff on the first portion of the cooking structure or the second portion of the cooking structure with both direct thermal energy from the first heat source and indirect thermal energy from the second heat source. The separator positioned between the first cooking volume and the second cooking volume is to at least partially define a physical boundary between the first cooking volume and the second cooking volume. The housing assembly includes a single integrated outer structure that defines the two cooking volumes. The separator may be disposed within the outer structure. The separator includes a substantially planar structure that substantially corresponds to the cross-sectional area of the outer structure defined between the first cooking volume and the second cooking volume. The housing assembly may be partially comprised of a lid that may be dimensioned to cover both of the two cooking volumes in a closed position. The separator may include an upper separator portion and a lower separator portion. The upper separator portion may be disposed between the first and second portion of the cooking structures and the lid. The lower separator portion may be disposed between the first and second portion of the cooking structures and a lower portion of the housing assembly. The vent assembly disposed in the separator, the vent assembly being configured to selectively enable fluid communication between the first cooking volume and the second cooking volume. The positioning mechanism may be mechanically coupled to the vent assembly. The positioning mechanism may extend from the housing assembly such that the vent assembly is configurable in a closed position, a partially open position, and an open position from an environment external to the housing assembly. The separator may include one or more apertures. The upper separator portion may be attached to the lid. The upper separator portion may include one or more apertures, which may be rotationally offset relative to one another. The vent assembly may be configured to move relative to the separator to selectively close the plurality of apertures. The vent assembly may be disposed on the upper separator portion. The vent assembly may include a vent plate that defines a second plurality of apertures. The vent assembly may include a positioning mechanism that protrudes from the lid such that the vent assembly is configurable in a closed position, a partially open position, and an open position when the lid is in the closed position. At least a portion of the vent assembly is configured to move relative to the separator to selectively close the first plurality of apertures. Movement of the vent assembly relative to the separator may include a rotational movement of the vent plate such that the second plurality of apertures is misaligned relative to the first plurality of apertures. The wood pellet burner may be feedable via an automatic pellet feed subsystem. The automatic pellet feed subsystem may draw pellets from the wood pellet reservoir. The wood pellet reservoir may be disposed on a side of the second cooking volume or in a vertical arrangement relative to the second cooking volume.

Another aspect of the invention includes a duel-fuel source cooking device. The cooking device may include a housing assembly, a frame, a separator, one or more cooking structures, a wood pellet reservoir, a vent assembly, a first heat source, and a second heat source. The housing assembly may at least partially define two cooking volumes. The cooking volumes may be positioned adjacent to one another. For instance, the cooking volumes may be arranged in a side-by-side arrangement or in another suitable arrangement. The housing assembly includes one or more components such as a lower housing portion and a lid. The lower housing portion may define lower volumes of the two cooking volumes. The lid maybe rotatably attached to the lower housing portion. The lid may be dimensioned to cover the lower volumes of the two cooking volumes in a closed position. The lid and the lower housing portion comprise a single integrated outer structure. The frame may be attached or otherwise coupled to the lower housing portion. The frame may retain the housing assembly relative to an environmental surface. The first heat source may be of a specific type such as a low-pressure gas grill or another direct heating source. The gas grill may be disposed in a first cooking volume of the two cooking volumes. The first heat source may be positioned relative to a first portion of the cooking structure to provide thermal energy directly to the first portion of the cooking structure. The second heat source may include a wood pellet burner or another indirect heat source. The second heat source may be disposed in a second cooking volume of the two cooking volumes. The second heat source may be occluded from a second portion of the cooking structure such that the second heat source is configured to provide thermal energy indirectly to the surface. The two cooking volumes may be configured for multiple types of operation. For instance, the cooking volumes may be configured to operate both independently and cooperatively to allow for selective cooking of a foodstuff on the first portion of the cooking structure or the second portion of the cooking structure with both direct thermal energy from the first heat source and indirect thermal energy from the second heat source. The separator may be disposed within the housing assembly. The separator may be positioned between the first cooking volume and the second cooking volume to at least partially define a physical boundary between the first cooking volume and the second cooking volume. The vent assembly may be disposed in or on the separator. The vent assembly may be configured to selectively enable fluid communication between the first cooking volume and the second cooking volume. The separator may include an upper separator portion and a lower separator portion. The upper separator portion may be disposed between the one or more cooking structures and the lid. The lower separator portion may be disposed between the one or more cooking structures and the lower housing portion of the housing assembly. The separator may be substantially planar structure that substantially corresponds to the cross-sectional area between the first cooking volume and the second cooking volume. In detail, the vent assembly may be at least partially disposed on the upper separator portion and the upper separator portion is attached to the lid. The vent assembly may include a positioning mechanism. The positioning mechanism may protrude from the lid such that the vent assembly is configurable in a closed position, a partially open position, and an open position when the lid is in the closed position. The wood pellet reservoir may be mechanically coupled to the housing assembly. The wood pellet burner may be feedable via an automatic pellet feed subsystem or another suitable feed system. The automatic pellet feed subsystem may draw pellets from the wood pellet reservoir. The wood pellet reservoir may be positioned between the frame and the housing assembly or mechanically attached to a side of the housing assembly.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limit its scope. The invention will be described and explained with additional specificity and detail through the use of the accompanying drawings in which:

FIG. 1 illustrates a block diagram of an exemplary cooking device;

BACKGROUND

Figure 2A:
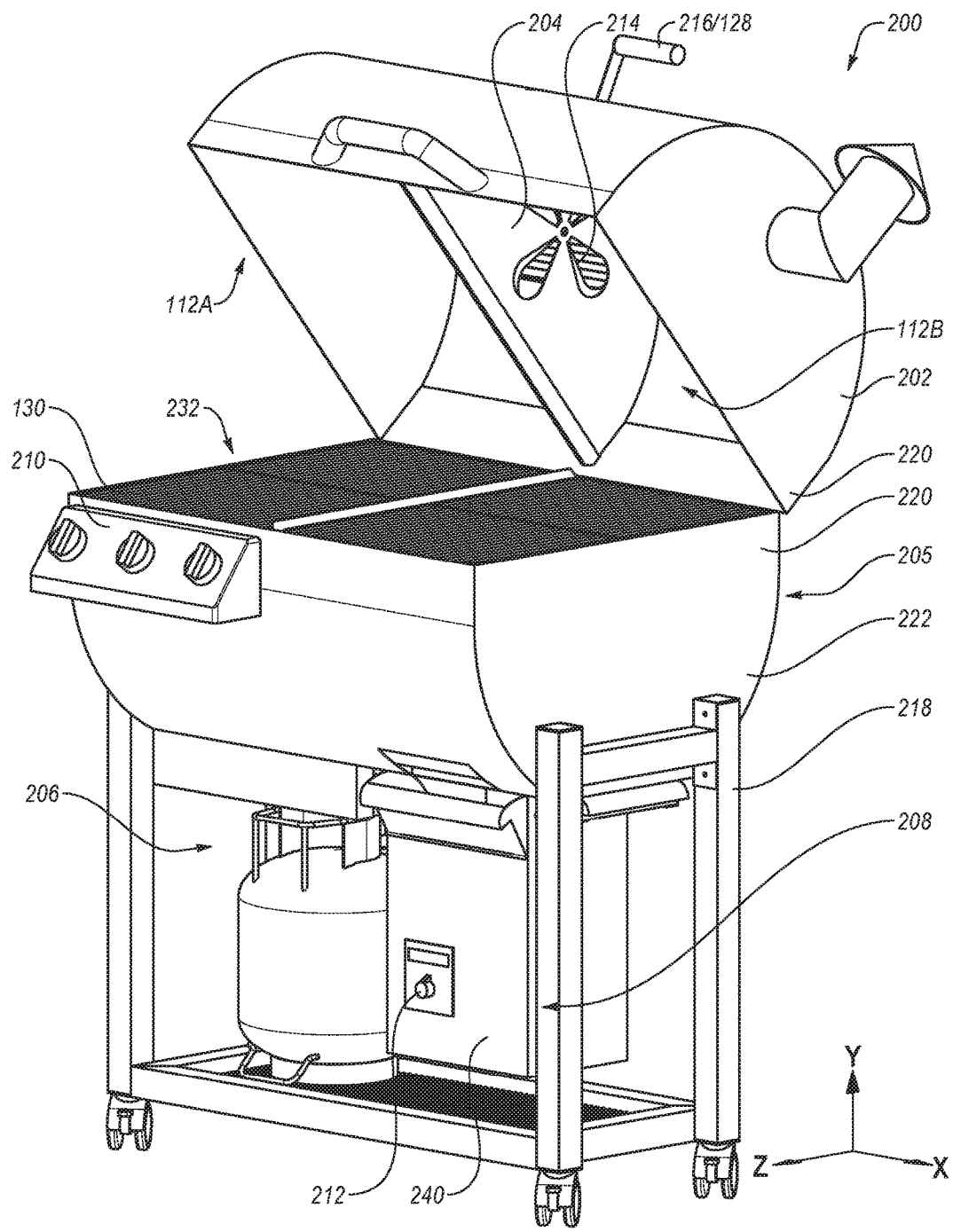
FIG. 2A illustrates a first embodiment of the cooking device of FIG. 1.

The present invention is directed towards cooking devices that include multiple heat sources. The heats sources are positioned adjacent to one another. For instance, the heat sources may be arranged in a side-by-side arrangement or another suitable arrangement. The principles of the present invention, however, are not limited to these cooking devices. It will be understood that, in light of the present disclosure, the components and arrangements disclosed herein can be successfully used in connection with other types of cooking devices.

Additionally, to assist in the description of the cooking devices, words such as top, bottom, front, rear, right, and left may be used to describe the accompanying figures. It will be appreciated that the cooking devices can be disposed in other positions, used in a variety of situations and may perform a number of different functions. In addition, the drawings may be to scale and may illustrate various configurations, arrangements, aspects, and features of the cooking devices. It will be appreciated, however, that the cooking devices may have other suitable shapes, sizes, configurations, and arrangements depending, for example, upon the intended use of the cooking devices. Further, the cooking devices may include any suitable number or combination of aspects, features and the like. A detailed description of exemplary embodiments of the cooking devices now follows.

FIG. 1 depicts a block diagram of an example cooking device 100 according to at least one embodiment described in the present disclosure. The cooking device 100 is a duel-fuel source cooking device. In the duel-fuel source cooking device 100 of FIG. 1, foodstuffs 102 and 104 may be cooked using thermal energy 110A-110D that is generated by one or both of two heat sources 106 and 108. In general, a first thermal energy 110A may be generated by a first heat source 106. The first thermal energy 110A may then propagate from the first heat source 106 into a lower portion (e.g., below the cooking structure 130) of a first cooking volume 112A. The first thermal energy 110A may directly heat a cooking structure 130 as well as the foodstuffs 102 on the cooking structure 130. Accordingly, the first heat source 106 may be implemented for direct heating of the foodstuffs 102. Direct heating as used in the present disclosure may indicate that the first thermal energy 110A emitted or generated from the first heat source 106 heats a bottom surface (e.g., a surface placed on the cooking structure 130) of the foodstuffs 102. Additionally, direct heating may indicate that the heat emitted or generated from the first heat source 106 is transferred to the cooking structure 130, which is then transferred to the foodstuffs 102 via conduction. Direct heating generally includes cooking processes that are short in duration when contrasted with indirect heating (direct heating is contrasted from indirect heating below). For instance, the direct heating process may have a duration of a few minutes (e.g., fewer than about 5 minutes in some embodiments). Accordingly, the first heat source 106 may include a first type of heat source such as a gas burner (e.g., propane burner or natural gas burner) that may be used for high-heat (e.g., greater than about 350 degree Fahrenheit (F)) and/or direct cooking processes. For instance, the first heat source 106 may include a high heat source relative to the second heat source 108. Thus, the first heat source 106 may be used for cooking processes such as directly heating (e.g., grilling, searing, blackening, etc.) the foodstuffs 102 placed on the cooking structure 130 or otherwise disposed in the cooking device 100.

The first thermal energy 110A may pass or be transferred through the cooking structure 130 to an upper portion (e.g., above the cooking structure 130) of the first cooking volume 112A. The second thermal energy 110B may include a portion or part of the first thermal energy 110A. The second thermal energy 110B may be selectively introduced into a second cooking volume 112B in some embodiments. In other embodiments, mixing may be prevented or substantially prevented between the first and second cooking volumes 112A and 112B. In these and other embodiments, the cooking device 100 may not include any of the second thermal energy 110B.

Similarly, a third thermal energy 110C may be produced or generated by a second heat source 108. The third thermal energy 110C is occluded from the cooking structure 130 by at least one structure. For instance, in FIG. 1, the third thermal energy 110C is separated from the cooking structure 130 by a diffuser 132. The diffuser 132 may reduce or prevent direct heating of the foodstuffs 104. Instead, the third thermal energy 110C may indirectly heat the foodstuffs 104. As used in the present disclosure, indirect heating indicates that a volume or an environment around the foodstuffs 102 and 104 may be heated. However, the second heat source 108 is occluded from the cooking structure 130 such that the third thermal energy 110C is diffused or substantially diffused to an environment that surrounds the foodstuffs 104. Indirect heating generally includes cooking processes that are long in duration when contrasted with direct heating. For instance, the indirect heating process may have a duration of several minutes to multiple hours (e.g., greater than about 7 minutes and up to about 12 hours, etc. in some embodiments).

The third thermal energy 110C may pass or be transferred through the cooking structure 130 to an upper portion (e.g., above the cooking structure 130) of the second cooking volume 112B. The fourth thermal energy 110D may include a portion or part of the third thermal energy 110C. The fourth thermal energy 110D may be selectively introduced into the first cooking volume 112A in some embodiments. In other embodiments, mixing may be prevented or substantially prevented between the first and second cooking volumes 112A and 112B. In these and other embodiments, the cooking device 100 may not include any of the fourth thermal energy 110D.

The first heat source 106 may be positioned such that the first thermal energy 110A and the second thermal energy 110B is first introduced to the first cooking volume 112A. For instance, the first heat source 106 may be positioned within the lower portion of the first cooking volume 112A. Similarly, the second heat source 108 may be positioned such that the third thermal energy 110C and the fourth thermal energy 110D is directly introduced to the second cooking volume 112B. For instance, the second heat source 108 may be positioned within the lower portion of the second cooking volume 112B.

In some embodiments, the first cooking volume 112A may be substantially independent of the second cooking volume 112B. In these and other embodiments, the cooking device 100 may include a separator 120, which may be positioned between the first cooking volume 112A and the second cooking volume 112B. The separator 120 may include a vent assembly 118 that selectively controls or at least partially controls introduction of the second thermal energy 110B to the second cooking volume 112B and/or introduction of the third thermal energy 110C to the first cooking volume 112A. The vent assembly 118 may then enable and/or control mixing between the first and second cooking volumes 112A and 112B.

In other embodiments, the cooking volumes 112A and 112B may be at least partially integrated. For example, in these and other embodiments, the separator 120 may be omitted or partially omitted, which may enable unregulated or at least partially unregulated or uncontrolled mixing of the second thermal energy 110B with the third thermal energy 110C. In yet other embodiments, the cooking volumes 112A and 112B may be separated and independent. In these and other embodiments, the separator 120 between the cooking volumes 112A and 112B may prevent or substantially prevent mixing between the thermal energies 110B and 110C.

In some embodiments, the vent assembly 118 may include a positioning mechanism 128. The positioning mechanism 128 may be configured to change or alter an amount of mixing that occurs between the first and second cooking volumes 112A and 112B. For example, the positioning mechanism 128 may position the vent assembly 118 in an open position in which a maximum amount of mixing occurs between the first and second cooking volumes 112A and 112B, a closed position in which a minimum amount or no mixing occurs between the first and second cooking volumes 112A and 112B, or position the vent assembly 118 between the open position and the closed position.

The positioning mechanism 128 may extend from the cooking device 100 into an environment surrounding the cooking device 100. Extension of the positioning mechanism 128 into the environment may enable adjustment of the vent assembly 118 without opening a lid and/or during operation of the cooking device 100.

The first heat source 106 is a different type of heat source than the second heat source 108. The first heat source 106 may include a first fuel source 124 in which fuel burned by the first heat source 106 is stored. The cooking device 100 may include a first heat control system 114. The first heat control system 114 may be configured to control a rate and/or amount of the fuel supplied to the first heat source 106. In some embodiments, the first heat source 106 may include a low pressure gas burner such as a propane or natural gas burner. In these embodiments, the first fuel source 124 may include a propane tank or natural gas tank and the first heat control system 114 may include one or more valves that control the rate at which the propane or natural gas is supplied to the gas burner.

The second heat source 108 may include a second fuel source 126 in which fuel burned by the second heat source 108 is stored. The cooking device 100 may include a second heat control system 116. The second heat control system 116 may be configured to control a rate and/or amount of the fuel supplied to the second heat source 108. In some embodiments, the second heat source 108 may include a wood pellet burner. In these embodiments, the second fuel source 126 may include a wood pellet reservoir and the second heat control system 116 may include an auger and auger control mechanism that controls the rate at which the wood pellets are supplied to the gas burner.

Accordingly, the cooking device 100 may enable high-heat operations and/or direct heating by the first heat source 106, low-heat operations and/or indirect heating by the second heat source 108, as well as cooking operations that involve both heat sources 106 and 108. These cooking operations that involve both heat sources 106 and 108 include some direct heating and some indirect heating. Due to inclusion of both heat sources 106 and 108, such cooking operations may be performed with minimal movement of the foodstuffs.

For example, the first heat source 106 and the second heat source 108 are usable independently. For instance, the first heat source 106 may be operated while the second heat source 108 is not operational and vice versa.

In addition, the first heat source 106 and the second heat source 108 may be usable concurrently and/or in some combination during a cooking process. Use of the heat sources 108 and 106 together may reduce fuel use and reduce time involved in the cooking process when compared to a similar process performed by conventional cooking devices.

For instance, an example smoking process may involve heating the second cooking volume 112B to about 225 degrees F. or another suitable temperature. After the second cooking volume 112B is about 225 degrees F., the foodstuff 104 may be placed on the cooking structure 130. The second cooking volume 112B may be maintained at about 225 degrees F. for several hours while the foodstuff cooks. During at least a portion of the several hours, smoke may be introduced and maintained in the second cooking volume 112B. After several hours, the foodstuff may be finished by searing the foodstuff.

The cooking device 100 may be used to implement this example smoking process. In particular, the first heat source 106 may be used to heat the second cooking volume 112B to the 225 degrees F. The first heat source 106 may include a gas grill, which may be capable of heating the second cooking volume 112B to a particular temperature at a higher rate than the second heat source 108. During a process of heating up the second cooking volume 112B, the vent assembly 118 may be in the open position, which may enable the second thermal energy 110B to be introduced to the second cooking volume 112B.

After the second cooking volume 112B is heated by the first heat source 106, the second heat source 108 may be implemented to provide smoke and at least a portion of heat used to maintain the temperature indirectly in the second cooking volume 112B. The heat provided by the first heat source 106 may be reduced to supplement the heat supplied by the second heat source 108. For example, the vent assembly 118 may be arranged to a position between the open position and the closed position, which may reduce the second thermal energy 110B introduced to the second cooking volume 112B. Additionally or alternatively, the first heat control system 114 may bring the operation of the first heat source 106 to a lower (e.g., less thermal output) operating condition. Accordingly, the fuels used by the first heat source 106 and the second heat source 108 may be reduced.

The second heat source 108 may be turned off when the smoke is no longer introduced to the second cooking volume 112B and the first heat source 106 may be increased or the vent assembly 118 may be re-positioned to maintain the temperature in the second cooking volume 112B for the remainder of several hours.

After the several hours, the operation of the first heat source 106 may be increased to finish the foodstuffs. For example, the vent assembly 118 may be closed and the first heat source 106 may be transitioned to a higher operating condition in which more thermal energy is introduced into the first cooking volume 112A. After the temperature in the first cooking volume 112A is sufficiently increased, the foodstuffs 104 may be physically transferred to the first cooking volume 112A.

During the cooking process described above and implemented by the cooking device 100, the foodstuffs 104 may remain in the second cooking volume 112B during the slow cooking process and smoking process. A user may simply adjust the heat sources 106 and 108 or the vent assembly 118 to control the temperature and cooking conditions (e.g., presence of smoke) in the second cooking volume 112B. This functionality may lower the fuel used during the process compared to conventional cooking devices and may reduce time involved in heat up processes.

Additionally, in some embodiments, during the cooking process an upper lid 175 and the lower door 400 may be maintained in the closed positions. Consequently, thermal losses to the environment may be reduced or prevented. Thus, the cooking process implemented by the cooking device 100 may reduce or eliminate a need to move the foodstuffs from one cooking device to another and to wait long periods of time while a low-temperature heat source is used to heat the volume relative to conventional cooking devices.

Additionally, in embodiments in which the positioning mechanism 128 extends from the cooking device 100, the temperature of the second cooking volume 112B may be maintained or adjusted without interrupting the operation of the cooking device 100. For instance, positions of the vent assembly 118 may be set without opening a lid or otherwise exposing the second cooking volume 112B to the environment.

Figure 2B:
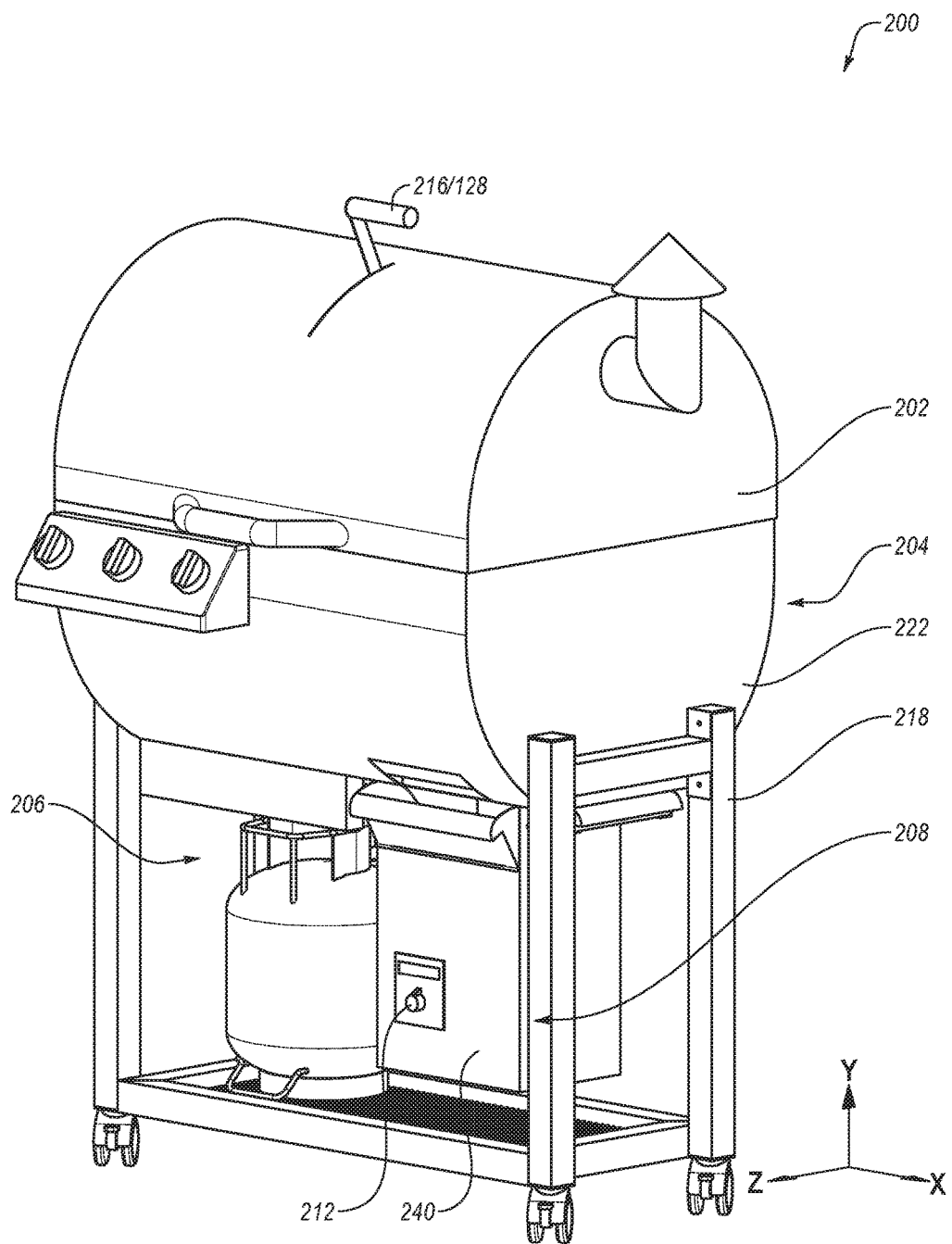
FIG. 2B illustrates the cooking device of FIG. 2A with a lid in a closed position.

FIGS. 2A and 2B illustrate a first embodiment of a duel-fuel source cooking device (first cooking device) 200. FIG. 2A is a view of the first cooking device 200 with a lid 202 in an open position. FIG. 2B illustrates the first cooking device 200 with the lid 202 in a closed position. The first cooking device 200 includes a duel-fuel source cooking device similar to that described with reference to FIG. 1. The first cooking device 200 may include a housing assembly 205, a first heat source 206, a second heat source 208, a first heat control system 210, a second heat control system 212, a separator 204, a frame 218, a vent assembly 214, and a positioning mechanism 128/216.

In the first cooking device 200, the housing assembly 205 may include an outer structure 220. The outer structure 220 may define the two cooking volumes, which may include the first cooking volume 112A and 112B described with reference to FIG. 1. The outer structure 220 may include the lid 202 and a lower housing portion 222. The lid 202 may be sized and configured to substantially correspond to a size and a shape of a cooking structure 226 and/or the lower housing portion 222. In the closed position of FIG. 2B, the lid 202 may at least partially seal against the lower housing portion 222. Accordingly, air or other fluids in the first cooking device 200 may be sealed in the cooking volumes 112A and 112B such that the fluids remain in the cooking volumes 112A and 112B.

In the closed position of FIG. 2B, the outer structure 220 makes a single integrated structure within which the cooking volumes 112A and 112B are defined. For example, in some embodiments, the lid 202 may include a single curved piece of material and the lower housing portion 222 may include a single curved piece of material. The lid 202 is rotatably attached to the lower housing portion 222 and configured to cover an entirety of an upper opening 232 of the lower housing portion 222. Accordingly, the outer structure 220 defines one integrated volume that is divided into the first and second cooking volumes 112A and 112B.

As described above, the first and second cooking volumes 112A and 112B are defined by the outer structure 220 in a side-by-side arrangement. Accordingly, the first cooking volume 112A may be separated from the second cooking volume 112B in the x-direction of FIG. 2A, which may be referred to as a lateral direction. In the depicted embodiment, the first and second cooking volumes 112A and 112B are immediately adjacent to one another in the first cooking device 200. In the side-by-side arrangement, the lid 202 spans both of the cooking volumes 112A and 112B in the lateral direction when the lid 202 is in the closed position.

In some embodiments, the cooking volumes 112A and 112B may be positioned in another suitable arrangement. For instance, the cooking volumes 112A and 112B may be in a back-to-back arrangement, an offset side-by-side arrangement, and angled arrangement, and the like.

The separator 204 may be sized and configured to at least partially physically separate the first cooking volume 112A from the second cooking volume 112B. In these and other embodiments, a separator at least partially defines a physical boundary between the first cooking volume 112A and the second cooking volume 112B. For example, the outer structure 220 may define a cross-sectional area between the first cooking volume 112A and the second cooking volume 112B. The separator 204, or at least some portion thereof, may include a shape that substantially corresponds to the cross-sectional area defined by the outer structure 220.

The frame 218 may be attached to the lower housing portion 222. The frame 218 is configured to retain the housing assembly 205 relative to an environmental surface. Some examples of the environmental surface may include the ground, a deck, a patio, a floor, or another environmental surface on which the first cooking device 200 is placed. In some embodiments, the first cooking device 200 may omit the frame 218. In these and other embodiments, the first cooking device 200 may be built into a structure such as an outdoor kitchen or patio structure.

The second cooking device 200 includes the two cooking volumes 112A and 112B. The cooking volumes 112A each include a portion of the cooking structure 130 arranged for placement of foodstuffs (e.g., 102 and 104). The two cooking volumes 112 are configured to operate both independently and cooperatively to allow for selective cooking of a foodstuff on the first portion of the cooking structure or the second portion of the cooking structure with both direct thermal energy from the first heat source and indirect thermal energy from the second heat source.

In the embodiment of FIGS. 2A and 2B, the first heat source includes a low-pressure gas grill, which may be disposed in the first cooking volume 112A. The first heat source is positioned relative to the first portion of the cooking structure to provide thermal energy directly to the cooking structure 130 or a portion thereof.

The second heat source may include a wood pellet burner. The second heat source may be disposed in the second cooking volume 112B of the two cooking volumes. The second heat source is occluded from the cooking structure 130 or some portion thereof. Accordingly, the second heat source is configured to provide thermal energy indirectly to the cooking structure 130 or some portion thereof.

The wood pellet burner may be feedable via an automatic pellet feed subsystem. The feed subsystem may be configured to draw pellets from a wood pellet reservoir 240 and deposit the pellets in the wood pellet burner. In the depicted embodiment, the wood pellet reservoir 240 may be configured to feed wood pellets to the wood pellet burner. Additionally, the wood pellet reservoir 240 may be positioned between the lower housing portion 222 and the frame 218. Positioning the wood pellet reservoir 240 between the lower housing portion 222 and the frame 218 may reduce a lateral dimension (e.g., in the x-direction) of the first cooking device 200 when compared to cooking devices having a reservoir on a side surface of the lower housing portion 222. A smaller lateral dimension may enable the use of the first cooking device 200 in smaller areas, which may include a balcony or a small deck, for instance. Embodiments in which the wood pellet reservoir is between the lower housing portion 222 and the frame 218 is referred to herein as a vertical arrangement. In other embodiments, the wood pellet reservoir 240 may be located in a horizontal arrangement in which the wood pellet reservoir 240 is attached to a side surface of the lower housing portion 222.

The wood pellet reservoir 240 may be mechanically coupled to the housing assembly 205. For example, the wood pellet reservoir 240 may be coupled to the lower housing portion 222. Additionally or alternatively, the wood pellet reservoir 240 may be mechanically coupled to the frame 218.

The first heat control system 210 may include one or more valves, which may control an amount of gas supplied to the first heat source. In the depicted embodiments, the first heat control system 210 may include three valves, one for each gas burner of the first heat source. In some other embodiments, the first heat control system 210 may include more than three or less than three valves. Additionally or alternatively, in some embodiments, the first heat control system 210 may include another suitable control mechanism such as electrically controlled valves, information displays, thermostats, and the like.

The second heat control system 212 may include a dial or knob. The second heat control system 212 may determine a rotational rate of an auger that feeds wood pellets to the second heat source. In some embodiments, the second heat control system 212 may be configured to be controlled based on a temperature in the first cooking device 200. For instance, a temperature may be set by a user. Responsive to the temperature dropping relative to the set temperature, a rotational rate of the auger may increase. Responsive to the temperature increasing relative to the set temperature, a rotational rate of the auger may decrease. With reference to FIG. 2A, the vent assembly 214 may be disposed in the separator 204. The vent assembly 214 may be configured to selectively enable fluid communication between the first cooking volume 112A and the second cooking volume 112B. The vent assembly 214 is configured to move relative to the separator 204 to selectively close or open one or more apertures defined in the separator 204. In some embodiments, movement of the vent assembly 214 relative to the separator 204 includes a rotational movement of a vent plate such that apertures of the vent plate are aligned or misaligned relative to the apertures of the separator 204.

Referring back to FIGS. 2A and 2B, the positioning mechanism 128/216 may be mechanically coupled to a component of the vent assembly 214. The positioning mechanism 128/216 may be an embodiment of the positioning mechanism 128 and may be substantially similar to the positioning mechanism 128 of FIG. 1.

The positioning mechanism 128/216 may be configured to enable a user to change a position of the vent assembly 214 relative to the separator 204. The positioning mechanism 128/216 may extend from the lid 202 of the housing assembly 205. In some embodiments, the positioning mechanism 128/216 may extend from the lid 202 such that the vent assembly 214, or some promotion thereof is configurable in a shut position, an open position, a partial open position, or some position therebetween from an environment that is external to the housing assembly 205. For instance, when the lid 202 is in the closed position as shown in FIG. 2B, a user may grip the positioning mechanism 128/216 and enable manipulation of the vent assembly 214 by the user.

Figure 3:
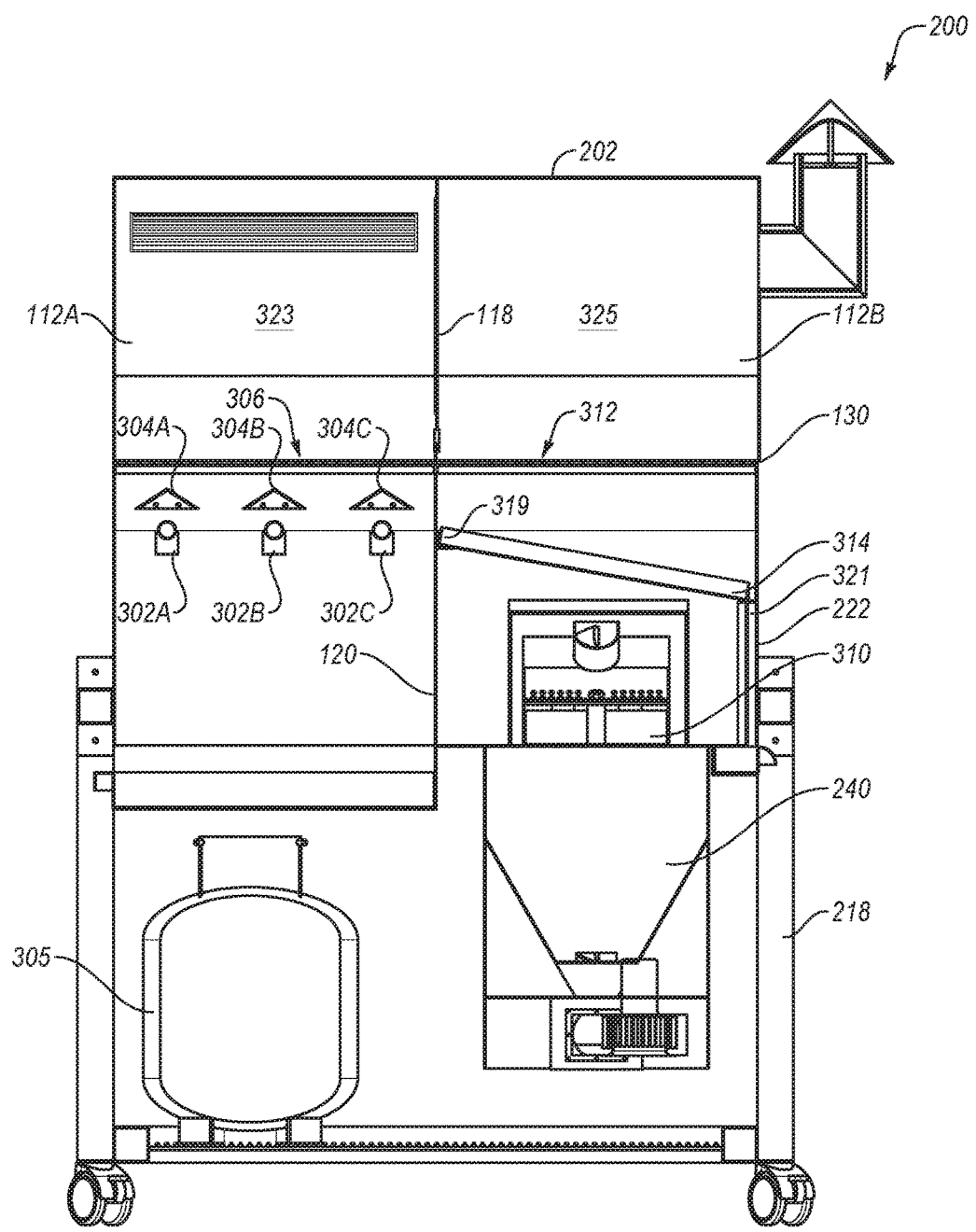
FIG. 3 illustrates a sectional view of the cooking device of FIG. 2A.

FIG. 3 is a sectional view of the first cooking device 200. In FIG. 3, the lid 202 is in the closed position such that the first cooking volume 112A and the second cooking volume 112B are substantially enclosed by the lid 202 and the lower housing portion 222. Sectional views of the first heat source 106 and the second heat source 108 are visible in FIG. 3.

The first heat source 106 includes multiple grill burners 302A-302C (generally, grill burner 302 or grill burners 302). The grill burners 302 may be positioned below a first portion 306 of the cooking structure 130. For example, the grill burners 302 may be located between about 1 inches and about six inches from first portion 306 of the cooking structure 130. The grill burners 302 may be supplied gas from a tank 305. For example, a heat control system (e.g., the first heat control system 114 of FIG. 1) may control an amount of gas that is supplied from the tank 305 to the grill burners 302. The supplied gas may then be ignited, which generates heat. The heat generated by the grill burners 302 may be applied directly to the first portion 306 of the cooking structure 130 and foodstuffs placed thereon.

In some embodiments, heat shields 304A-304B (generally, heat shield 304 or heat shields 304) may be positioned between the grill burners 302 and the first portion 306 of the cooking structure 130. The heat shields 304 may prevent or reduce exposure of flames of the grill burners 302 to grease or other flammable liquids that may be generated during cooking of foodstuffs. The heat shields 304 may heat the liquids and prevent the liquids from dripping directly onto the grill burners 302. The heat shields 304 may be separated from one another such that heat generated by combustion of the gas directly heats the first portion 306 of the cooking structure 130.

In the embodiment of FIG. 3, the second heat source 108 includes a wood pellet cooker 310. The wood pellet cooker 310 may be positioned below a second portion 312 of the cooking structure 130. The wood pellet cooker 310 is occluded from the second portion 312 by a diffuser structure 314. For example, the diffuser structure 314 may be positioned between the wood pellet cooker 310 and the second portion 312 of the cooking structure 130.

For example, in some embodiments, the wood pellet cooker 310 may be positioned about ten and fifteen inches from the second portion 312 of the cooking structure 130 and the diffuser structure 314 may be positioned about seven inches to about ten inches from the second portion 312. The diffuser structure 314 may be sloped. For instance, in the depicted embodiment, a first end 319 of diffuser structure 314 is closer to the second portion 312 than a second end 321 of the diffuser structure 314.

The wood pellet cooker 310 may be supplied wood pellets from the wood pellet reservoir 240. The wood pellet reservoir 240 in the depicted embodiment is below (e.g., have a smaller y-coordinate) than the wood pellet cooker 310. The wood pellets may be fed to the wood pellet cooker 310 using a vertical or substantially vertical auger system.

In some embodiments, a heat control system (e.g., the heat control system 116 of FIG. 1) may control an amount of wood pellets that are supplied from the wood pellet reservoir 240 to the wood pellet cooker 310. The supplied wood pellets may then be ignited, which generates heat. The heat generated by the combustion of the wood pellets may be indirectly applied to the second portion 312 of the cooking structure 130 and foodstuffs placed thereon. For example, the diffuser structure 314 may prevent or reduce direct heating of the second portion 312 of the cooking structure by the wood pellet cooker 310.

The first cooking volume 112A is separated from the second cooking volume 112B by the separator 120. The separator 120 may extend from the lower housing portion 222 up to the lid 202 when the lid 202 is in the closed position. Accordingly, the first cooking volume 112A may operate substantially independently of the second cooking volume 112B. For instance, heat generated by the wood pellet cooker 310 may be confined or substantially confined by the separator 120 and the lower housing portion 222 such that the heat is directed to the second portion 312 of the cooking structure 130 instead of the entirety of the cooking structure 130. Similarly, the heat generated by combustion of the gas by the grill burner 302 may be confined or substantially confined by the separator 120 and the lower housing portion 222 such that the heat is directed to the first portion 306 of the cooking structure 130 instead of the entirety of the cooking structure 130.

Each of the first and second cooking volumes 112A and 112B include upper volumes 323 and 325, respectively. A first upper volume 323 may be defined by a part of the lid 202, an upper portion of the separator 120, and the first portion 306 of the cooking structure 130. A second upper volume 325 may be defined by another part of the lid 202, the upper portion of the separator 120, and the second portion 312 of the cooking structure 130.

As shown in FIG. 3, the first upper volume 323 is separated from the second upper volume 325 by the separator 120. Accordingly, heat in the first upper volume 323 may be contained or at least partially contained in the first upper volume 323. Similarly, heat in the second upper volume 325 may be contained or at least partially contained in the second upper volume 325. As discussed above, the separator 120 may include the vent assembly 118. The vent assembly 118 is configured to selectively control mixing between the first upper volume 323 and the second upper volume 325. Accordingly, with the vent assembly 118 in a closed position, the first and second upper volumes 323 and 325 (and the first and second cooking volumes 112A and 112B) are substantially independent. With the vent assembly 118 in an open position or any position between the open position and the closed position, the first and second upper volumes 323 and 325 (and the first and second cooking volumes 112A and 112B) may be fluidly connected. With the first and second upper volumes 323 and 325 fluidly connected, the heat generated by the grill burners 302 may be used to heat the second upper volume 325 and the heat generated by the wood pellet cooker 310 may be used to heat the first upper volume 323.

Figure 4:
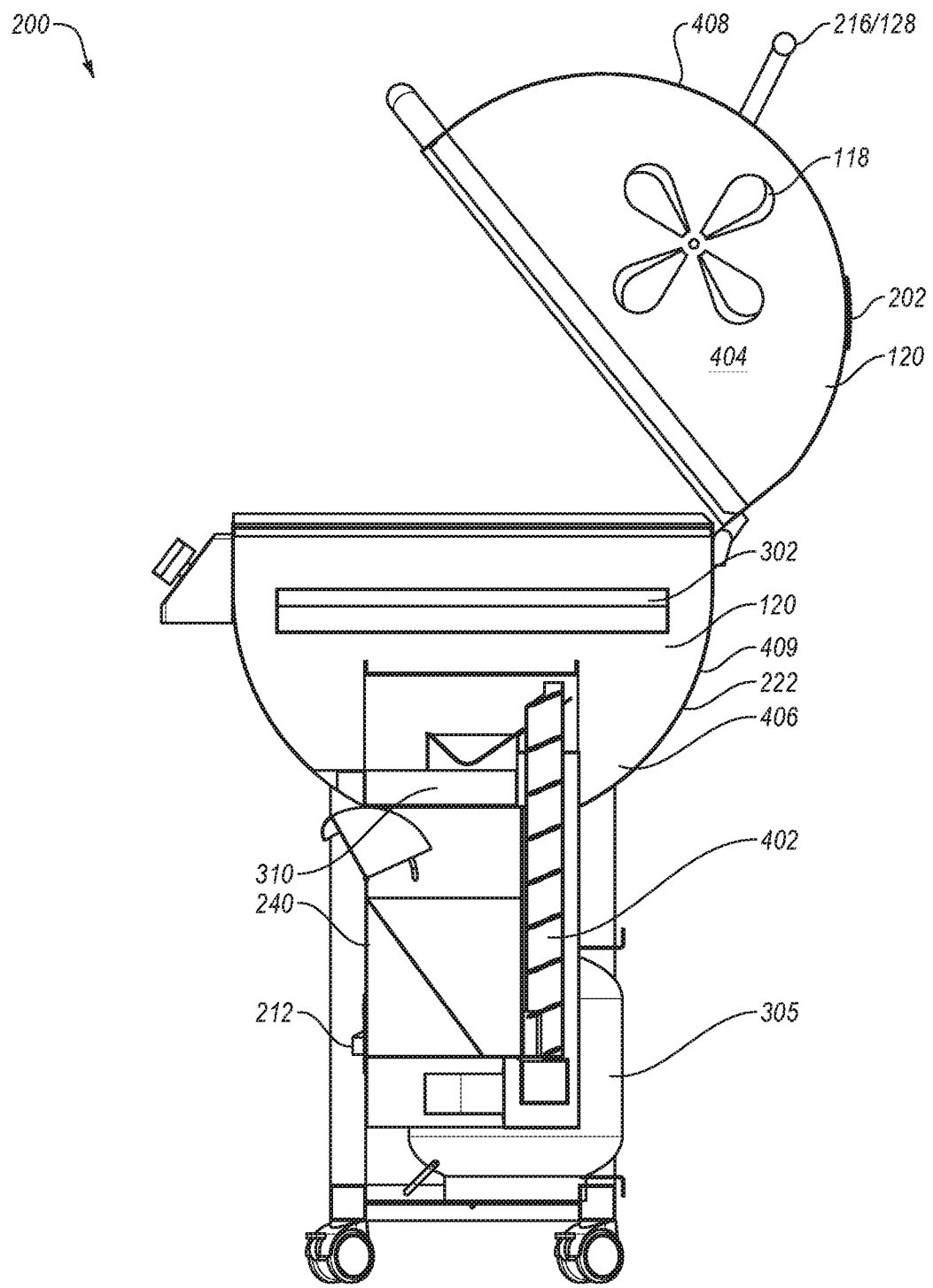
FIG. 4 illustrates another sectional view of the cooking device of FIG. 2A with the lid in an open position.

FIG. 4 depicts another sectional view of the first cooking device 200. In FIG. 4, the sectional plane is positioned such that one end of the lid 202 and one end of the lower housing portion 222 is removed. Additionally, a sectional view of the wood pellet cooker 310 and the wood pellet reservoir 240 is depicted. Wood pellets may be placed in the wood pellet reservoir 240, which includes a volume that narrows towards the bottom. The wood pellets may then be fed into a vertical auger 402 that lifts the wood pellets to wood pellet cooker 310. A rotational speed of the auger 402 may be controlled by the second control system 212. For instance, the second control system 212 may increase the rotational speed and thus the amount of wood pellets fed to the wood pellet cooker 310.

In the embodiment of FIG. 4, the separator 120 may include two portions 404 and 406. For example, the separator 120 may include an upper separator portion 404 and a lower separator portion 406. The upper separator portion 404 may be attached to the lid 202. For instance, the upper separator portion 404 may conform to an inner surface of the lid 202. An outer edge 408 of the upper separator portion 404 may be welded or otherwise mechanically coupled to the inner surface of the lid 202. The vent assembly 118 may be positioned in the upper separator portion 404. The lower separator portion 406 may be attached to the lower housing portion 222. For instance, the lower separator portion 406 may conform to an inner surface of the lower housing portion 222. An outer edge 409 of the lower separator portion 406 may be welded or otherwise mechanically coupled to the inner surface of the lower housing portion 222.

Figure 5:
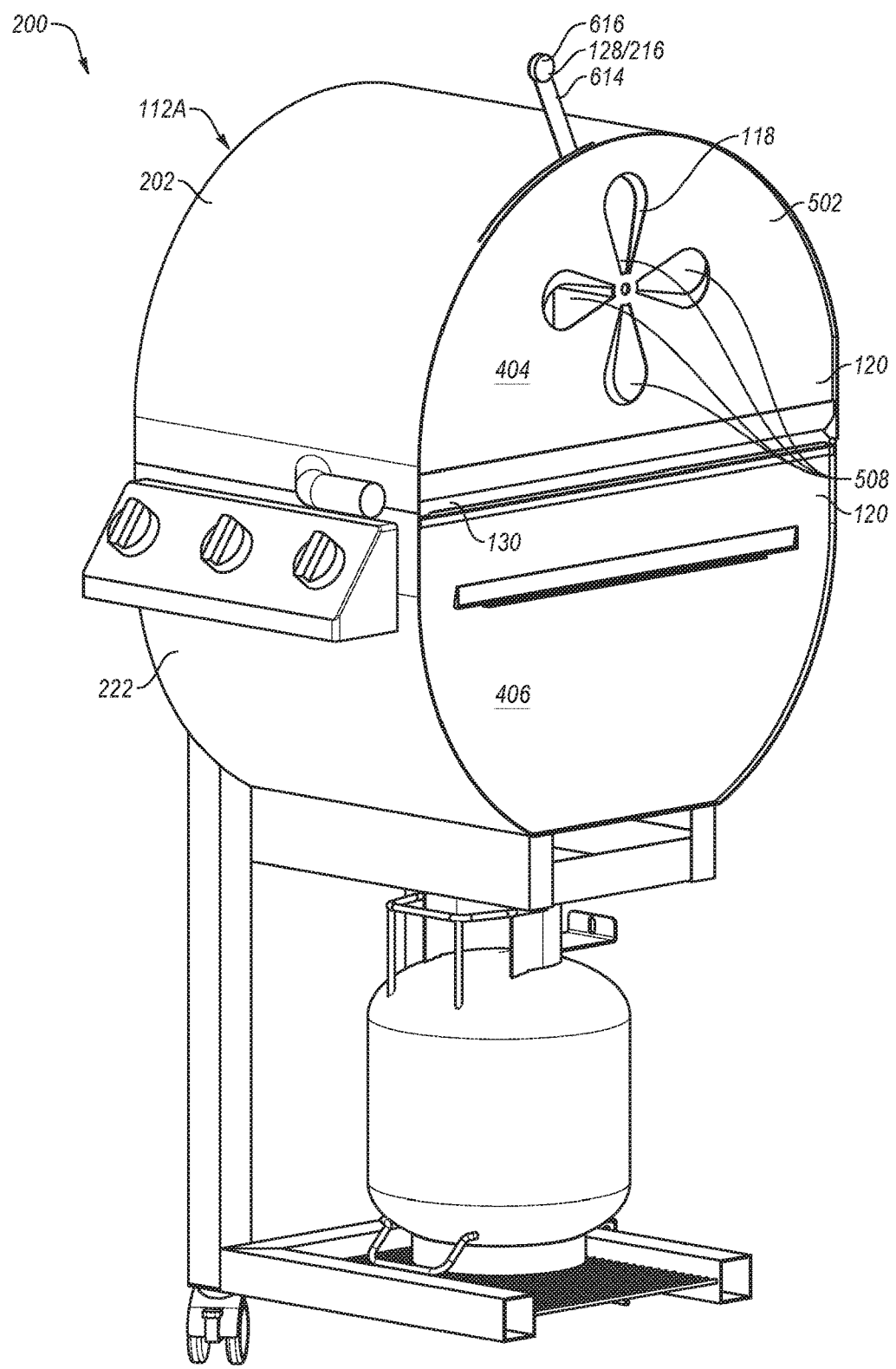
FIG. 5 illustrates another sectional view of the cooking device of FIG. 2A with the lid in the closed position.
Figure 6:
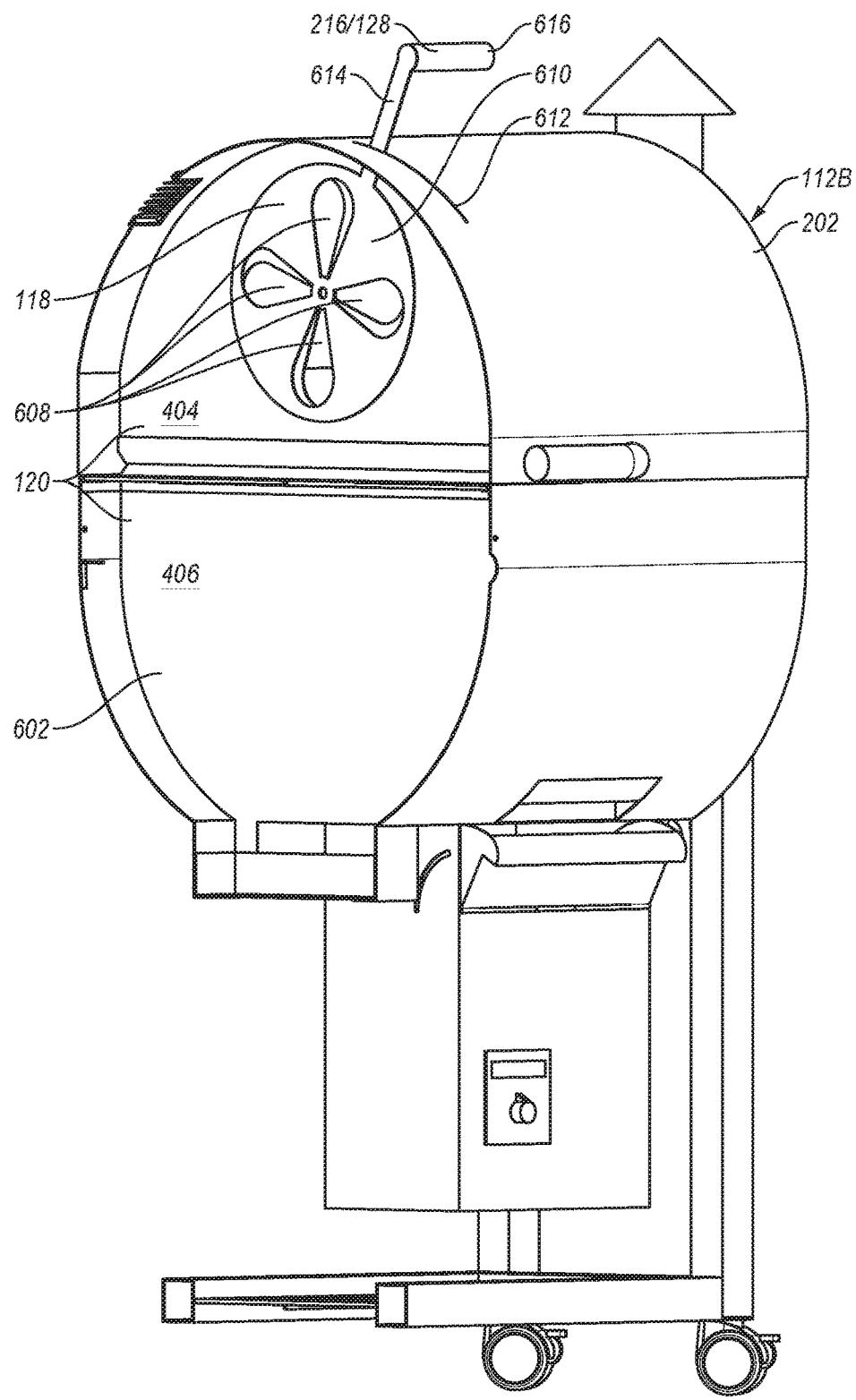
FIG. 6 illustrates another sectional view of the cooking device of FIG. 2A with the lid in the closed position.

FIGS. 5 and 6 illustrate the first cooking volume 112A and the second cooking volume 112B, respectively. In particular, FIG. 5 illustrates a sectional view of the cooking device 200 of FIG. 2A with the lid 202 in the closed position. In FIG. 5, the sectional plane is positioned such that a first surface 502 of the separator 120 is visible. The first surface 502 of the separator 120 defines a boundary of the second cooking volume 112B of FIG. 6. FIG. 6 illustrates another sectional view of the cooking device 200 of FIG. 2A with the lid 202 in the closed position. In FIG. 6, the sectional plane is positioned such that a second surface 602 of the separator 120 is visible. The second surface 602 of the separator 120 defines a boundary of the first cooking volume 112A of FIG. 6.

As visible in FIGS. 5 and 6, the cooking volumes 112A and 112B are essentially self-contained and independent. For instance, in FIG. 5, the first cooking volume 112A may be defined by parts of the lower housing portion 222, the lid 202, and the separator 120. Accordingly, when the lid 202 is in the closed position, the separator 120 is an inner boundary of the first cooking volume 112A. The upper separator portion 404 forms a portion of the first cooking volume 112A from the lid 202 to the cooking structure 130. Similarly, the lower separator portion 406 forms a portion of the first cooking volume 112A from the lower housing portion 222 up to the cooking structure 130. The second cooking volume 112B of FIG. 6 includes a similar structure to that of the first cooking volume 112A.

In the embodiment of FIGS. 5 and 6, the separator 120 may define one or more apertures 508 in the upper separator portion 404. The apertures 508 are rotationally offset from one another. In other embodiments, the separator 120 may define or include other apertures in other arrangements. For instance, the apertures 508 may be substantially rectangular and/or in a stacked or vertical arrangement.

In the embodiment of FIGS. 5 and 6, the vent assembly 118 is disposed on the separator 120. The vent assembly 118 is positioned to enable mixing and fluid communication between the first cooking volume 112A and the second cooking volume 112B. The vent assembly 118 is positioned on the upper separator portion 404.

The vent assembly 118 of FIGS. 5 and 6 define a second set of apertures 608. For instance, the vent assembly 118 includes a vent plate 610 that defines the apertures 608. The vent assembly 118 is configured to move relative to the separator 120 to selectively close, open, and partially open the apertures 508 of the upper separator portion 404. For instance, the movement of the vent assembly 118 relative to the separator 120 includes a rotational movement of the vent plate 610 such that the apertures 608 are misaligned relative to the apertures 508 of the separator 120.

The vent assembly 118 includes the positioning mechanism 128. The positioning mechanism 128 may protrude from the lid 202. For instance, the lid 202 may define a slot 612 through which a portion 614 of the positioning mechanism 128 extends. For instance, the portion 614 of the positioning mechanism 128 extends from the vent plate 610 of the vent assembly 118 and through the slot 612. A handle 616 may be disposed at an opposite end of the portion 614 that connects to the vent plate 610. The handle 616 is accessible by a user in the environment that surrounds the first and second cooking volumes 112A and 112B. Accordingly, the vent assembly 118 is configurable in a closed position, a partially open position, and an open position when the lid 202 is in the closed position. For instance, the positioning mechanism 128 may extend to an environment external to the cooking volumes 112A and 112B, which allows rotation of the vent plate 610 by a user. In the embodiment of FIGS. 5 and 6, the vent assembly 118 is in a partially open position.

Figure 7A:
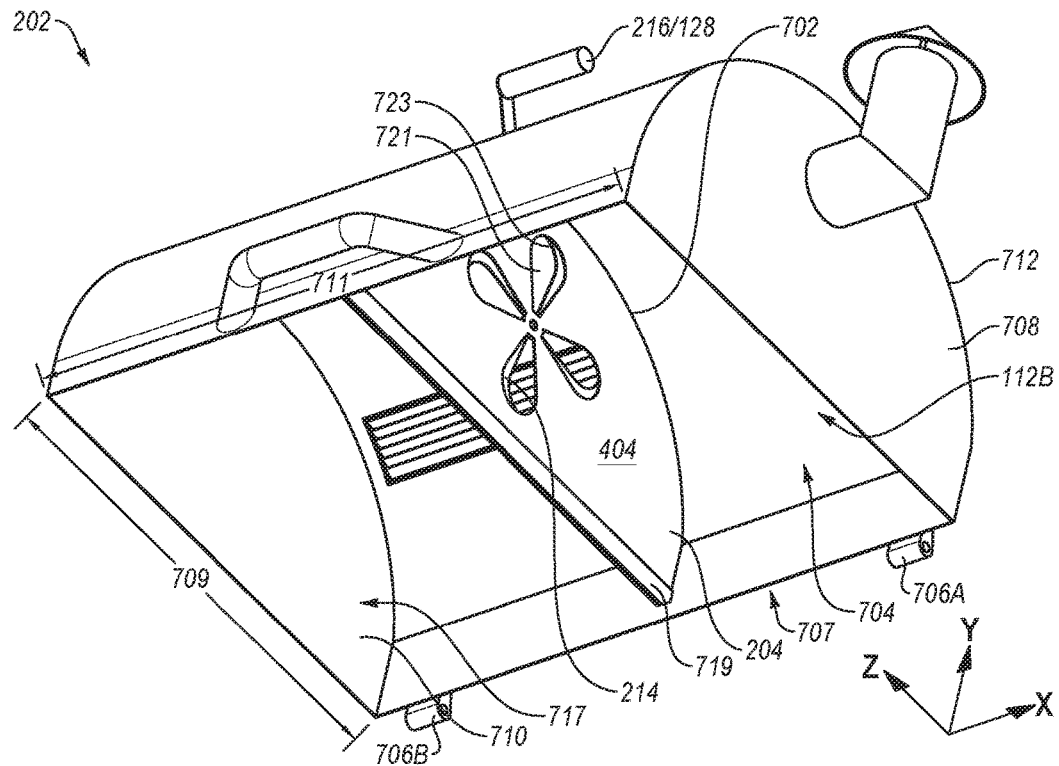
FIG. 7A illustrates a first view of an embodiment of the lid of FIG. 2B.
Figure 7B:
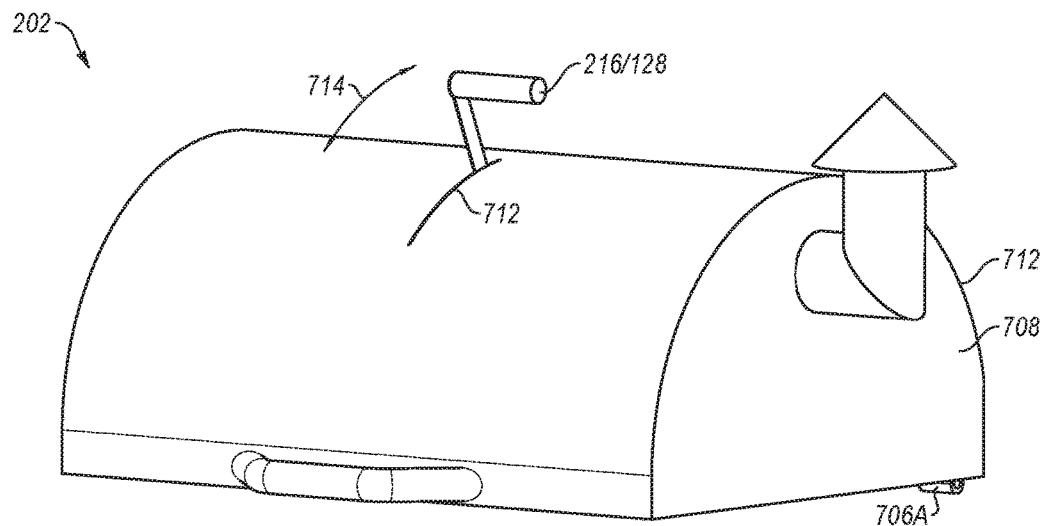
FIG. 7B illustrates another view of the lid of FIG. 7A.

FIGS. 7A and 7B illustrate an example embodiment of the lid 202. FIG. 7A depicts a lower perspective view of the lid 202. FIG. 7B depicts an upper perspective view of the lid 202. The lid 202 may be configured to be rotatably attached to a lower housing portion such as the lower housing portion 222 described above. For instance, in the embodiment of FIGS. 7A and 7B, hinges 706A and 706B may be attached to a lower edge 707 of the lid 202. The lid 202 may rotate relative to the lower housing portion 222 to be arranged in an open position, a closed position, and positions between the open position and the closed position.

The lower edge 707 of the lid 202 may be substantially rectangular. The lower edge 707 may include a length 709 (in a Z-direction) and a width 711 (in the X-direction). The length 709 and the width 711 may be dimensioned to cover the lower volumes of the two cooking volumes when the lid 202 is arranged in the closed position relative to the lower housing portion 222.

Referring to FIG. 7A, the lid 202 may include an inner surface 704. The inner surface 704 may extend along an arc of the lid 202. In the embodiment of FIG. 7A, the upper separator portion 404 of the separator 204 may include an edge 702 that abuts the inner surface 704 of the lid 202. The upper separator portion 404 may extend at least a portion of a distance from the inner surface 704 to a plane 717 bordered by the lower edge 707. The plane 717 of FIG. 7A may be coplanar with the XZ plane of FIG. 7A. The upper separator portion 404 may accordingly separate the first cooking volume 112A from the second cooking volume 112B or portions thereof defined by the lid 202.

In some embodiments, the upper separator portion 404 may include a shape that is substantially similar to a first end 710 and/or the second end 708 of the lid 202. For example, the upper separator portion 404 may include the edge 702, which is substantially arced. The upper separator portion 404 may also include a lower edge 719 between endpoints of the edge 702. The lower edge 719 may be substantially parallel to the plane 717. With combined reference to FIGS. 2A and 7A, the lower edge 719 may be configured to contact, be adjacent to, or to be immediately adjacent to the cooking structure 130 of FIG. 2A.

In some embodiments, the upper separator portion 404 may be mechanically attached to the inner surface 704. For example, the upper separator portion 404 may be welded or fastened to the inner surface 704 along the edge 702. In other embodiments, upper separator portion 404 may include another shape or may be omitted from the lid. Additionally, in the embodiment of FIG. 7A, the upper separator portion 404 is located at a position about one-half the width 711 from the first end 710 or the second end 708. In other embodiments, the upper separator portion 404 may be located nearer to the first end 710 or the second end 708.

Referring back to FIGS. 7A and 7B, the upper separator portion 404 may define multiple apertures 721 (FIG. 7A). The apertures 721 may be rotationally offset relative to one another. In other embodiments, the apertures 721 may be laterally and/or longitudinally offset from one another. Additionally or alternatively, the upper separator portion 404 may include a single aperture 721.

The vent assembly 214 may be disposed on the upper separator portion 404. The vent assembly 214 may be configured to selectively enable fluid communication between the first cooking volume 112A and the second cooking volume 112B or portions thereof defined by the lid 202. For example, the vent assembly 214 may include a vent plate that defines another set of apertures 723. The vent assembly 214 is configured to move or rotate relative to the upper separator portion 404. Movement of the vent assembly 214 positions the vent plate and the apertures 723 thereof relative to the apertures 721 of the vent assembly 214. Thus, movement of the vent assembly 214 relative to the upper separator portion 404 may open, close, partially close, or partially open the apertures 721 of the vent assembly 214.

The vent assembly 214 may include the positioning mechanism 128/216. The positioning mechanism 128/216 may be mechanically coupled to the vent assembly 214. As best illustrated in FIG. 7B, the positioning mechanism 128/216 may protrude from the lid 202. The positioning mechanism 128/216 may extend from the lid 202 into an environment that is external to a cooking device when the lid 202 is in a closed position. Extension of the positioning mechanism 128/216 may enable positioning of the vent assembly 214 when the lid 202 is in a closed position. For example, as visible in FIG. 7B, the lid 202 may define a positioning slot 712. The slot 712 may enable the positioning mechanism 128/216 to protrude through the lid 202. The positioning mechanism 128/216 may move in the slot 712, which may position the vent assembly 214 relative to the upper separator portion 404.

In the depicted embodiment, the positioning mechanism 128/216 is a lever with a handle. In other embodiments, the positioning mechanism 128/216 may include another structure such as a slide, a wheel, or another suitable structure. Moreover, the positioning mechanism 128/216 may include an electronic and/or a mechanical system, which may be controlled by an electronic controller external to the lid 202.

Figure 8A:
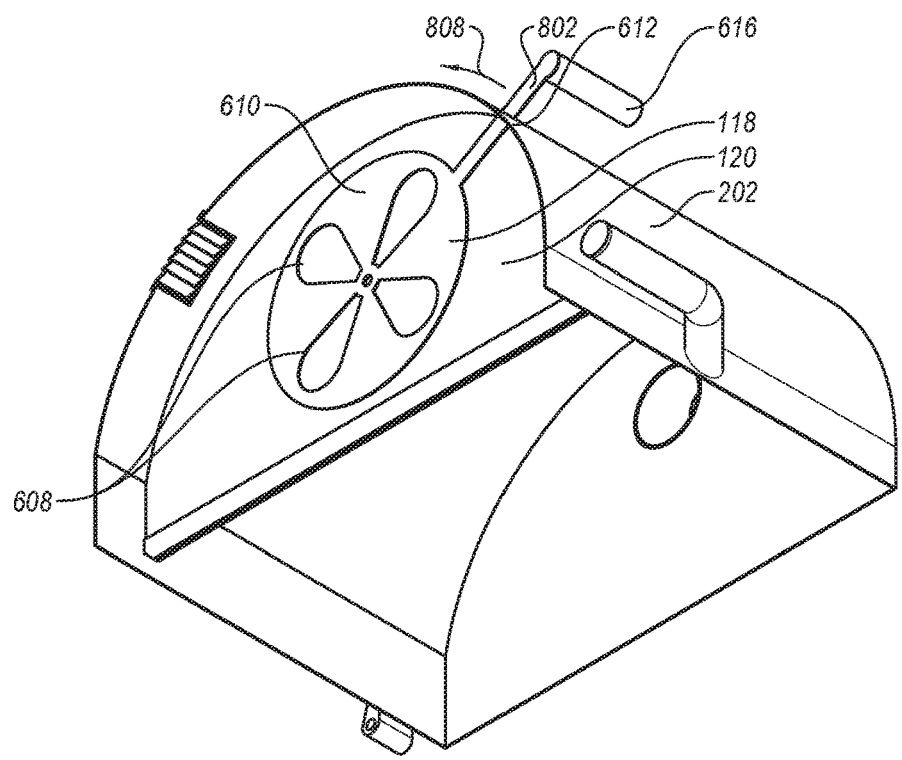
FIG. 8A illustrates a sectional view of the lid of FIG. 7A with an example vent assembly in a closed position.
Figure 8B:
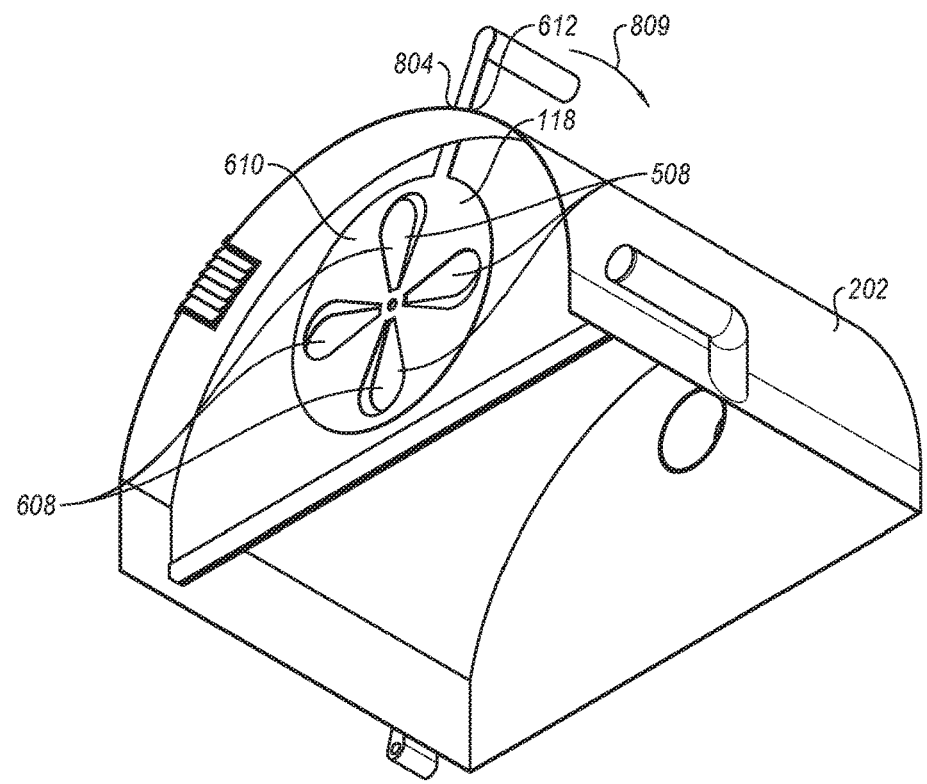
FIG. 8B illustrates another sectional view of the lid of FIG. 7A with the vent assembly in an open position.

FIGS. 8A and 8B illustrate sectional views of a portion of the lid 202 of FIGS. 7A and 7B. For example, the portion of the lid 202 of FIGS. 8A and 8B includes a portion that is included in the second cooking volume 112B of FIG. 6. FIG. 8A depicts the vent assembly 118 in a closed or shut position. In the closed position, the vent plate 610 is rotated to a position such that the apertures 608 of the vent plate 610 are misaligned relative to the apertures 508 of the separator 120. In this configuration, the second cooking volume 112B may operate substantially independently of the first cooking volume 112A. In the depicted embodiment, the vent assembly 118 is in the closed position when the handle 616 is rotated to a lowest position 802.

FIG. 8B depicts the vent assembly 118 in an open position. In the open position, the vent plate 610 is rotated to a position such that the apertures 608 of the vent plate 610 are substantially aligned relative to the apertures 508 of the separator 120. In this configuration, the second cooking volume 112B may be in fluid communication with the first cooking volume 112A. In the depicted embodiment, the vent assembly 118 is in the open position when the handle 616 is rotated to a highest position 802.

With combined reference to FIGS. 8A and 8B, to transition between the closed position and the open position, the handle 616 of the positioning mechanism 128/216 may be moved along an arc 808 of FIG. 8A. To transition between the open position and the closed position, the handle 616 of the positioning mechanism 128/216 may be moved along an arc 809 of FIG. 8B. The vent assembly 118 may be positioned at any point between the highest position 802 at one end of the slot 612 and the lowest position 802 of the slot 612. The vent assembly 118 moves independently and relative to the separator 120 and the lid 202. In the depicted embodiment, the vent assembly 118 rotates independently and relative to the separator 120 and the lid 202.

Figure 9C:
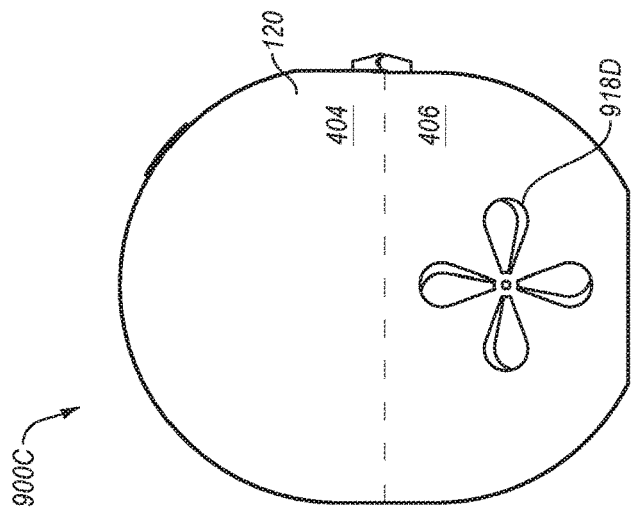
FIG. 9C illustrates a third example separator that may be implemented in the cooking device of FIG. 2A.
Figure 9B:
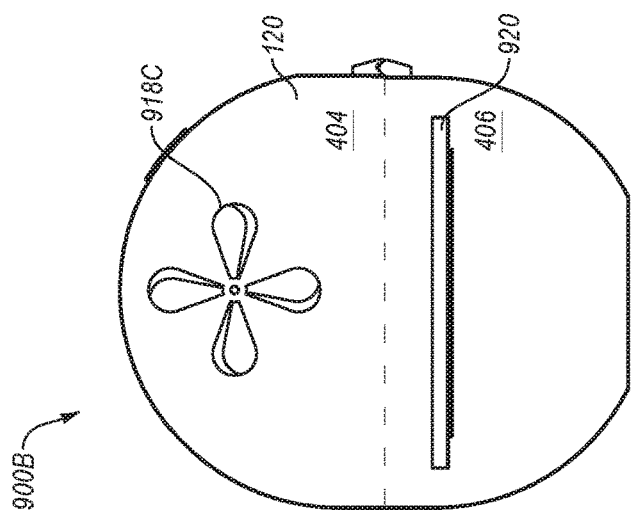
FIG. 9B illustrates a second example separator that may be implemented in the cooking device of FIG. 2A.
Figure 9A:
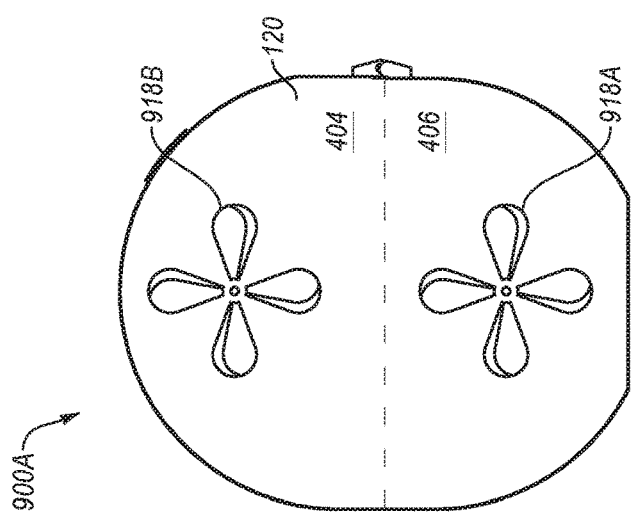
FIG. 9A illustrates a first example separator that may be implemented in the cooking device of FIG. 2A.

FIGS. 9A-9C illustrate example separators 900A-900C (generally, separator 900 or separators 900) that may be implemented in the cooking device 200 of FIGS. 2A and 2B. The separators 900 depict some example positions of vent assemblies 918A-918D (generally, vent assembly 918 or vent assemblies 918) on the separators 900. The vent assemblies 918 are substantially similar to and may correspond to the vent assembly 118 described elsewhere in the present disclosure. In addition, the separators 900 may be substantially similar to the separator 120 described elsewhere in the present disclosure. For instance, the vent assemblies 918 may include a vent plate (e.g., 610) having one or more apertures (e.g., 608). The separators 900 may also include one or more apertures (e.g., 508). Operation of the vent assemblies 918 may include rotation or movement of the vent assemblies 918 relative to the separators 900.

With reference to FIG. 9A, the first separator 900A may include a first vent assembly 918A and a second vent assembly 918B. The first vent assembly 918A may be disposed in the lower separator portion 406 and the second vent assembly 918B may be disposed in the upper separator portion 404. With reference to FIG. 9B, the second separator 900B may include a third vent assembly 918C. The third vent assembly 918C may be disposed on the upper separator portion 404. With reference to FIG. 9C, the third separator 900C may include a fourth vent assembly 918D. The fourth vent assembly 918D may be disposed in the lower separator portion 406.

Referring to FIGS. 9A and 9C, the first vent assembly 918A and the fourth vent assembly 918D are disposed on the lower separator portion 406. The first vent assembly 918A and the fourth vent assembly 918D may enable fluid communication in a lower portion of cooking volumes such as the cooking volumes 112A and 112B described elsewhere in the present disclosure. The first and fourth vent assemblies 918A and 918D may accordingly allow heat and/or smoke to pass across the lower portions of the first separator 900A and the third separator 900C, respectively.

Referring to FIGS. 9A and 9B, the second vent assembly 918B and the third vent assembly 918C are disposed on the upper separator portion 406. The second vent assembly 918B and the third vent assembly 918C may enable fluid communication in an upper portion of cooking volumes such as the cooking volumes 112A and 112B. The second and the third vent assemblies 918B and 918C may accordingly allow heat and/or smoke to pass across the upper portions of the first separator 900A and the second separator 900B, respectively.

The separators 900A may be separated into the upper separator portion 404 and the lower separator portion 406. Alternatively, the first separator 900A may be a single piece in which the upper separator portion 404 and the lower separator portion 406 are joined or integrally formed. In these and other embodiments, the vent assemblies 918 may be disposed in the regions shown in FIGS. 9A-9C or other suitable regions.

With reference to FIG. 9B, a secondary vent assembly 920 may be disposed on the second separator 900B. The secondary vent assembly 920 is a rectangular aperture that is oriented long-wise across the second separator 900B. The secondary vent assembly 920 may include a rectangular vent plate that is moved relative to the second separator 900B to change or modify a size of the rectangular aperture. In the depicted embodiment, the secondary vent assembly 920 is included in the lower separator portion 406. In other embodiments, the secondary vent assembly 920 may be disposed on the upper separator portion 404 or both the lower and upper separator portions 404 and 406.

Figure 10:
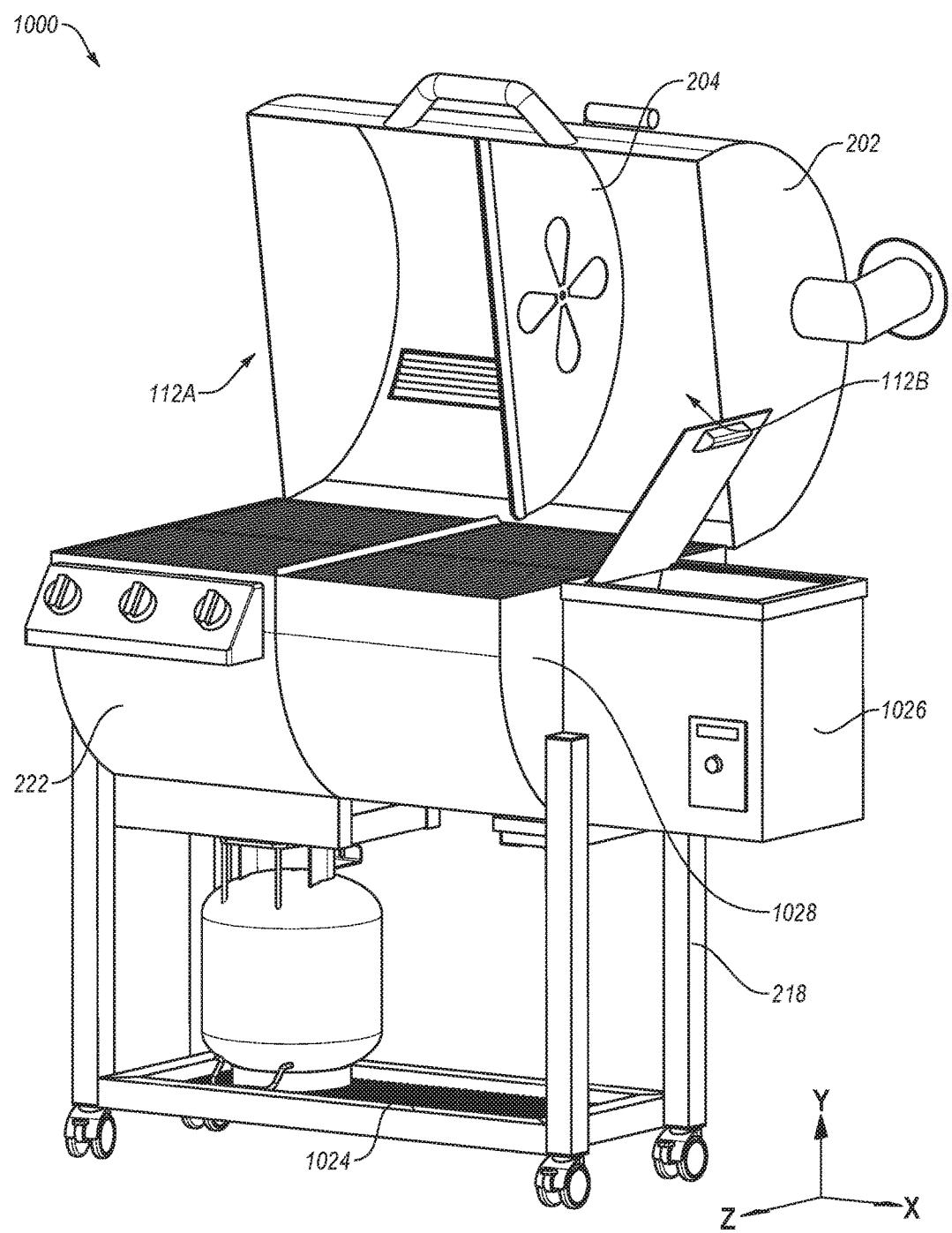
FIG. 10 illustrates a second embodiment of the cooking device of FIG. 1.

FIG. 10 illustrates a second embodiment of the cooking device (second cooking device) 1000. FIG. 10 is a view of the second cooking device 1000 with the lid 202 in an open position. The second cooking device 1000 is substantially similar to the first cooking device 200. For instance, the second cooking device 1000 may include the housing assembly 205 that includes the separator 204 and the two cooking volumes 112A and 112B. Additionally, the second cooking device 1000 includes a duel-fuel source cooking device as described elsewhere in the present disclosure. The second cooking device 1000 operates similarly to the first cooking device 200 including two cooking volumes 112A and 112B and two heat sources in a side-by-side arrangement. The heat sources of the second cooking device 1000 may include the heat sources 106 and 108 described above. In particular, the first heat source 106 may provide direct heat and a second heat source 108 may provide indirect heat.

In the second cooking device 1000 of FIG. 10, a wood pellet reservoir 1026 is positioned on an outer side surface 1028 of the lower housing portion 222. In these embodiments, an auger mechanism may move wood pellets laterally (e.g., in a negative x-direction). With combined reference to FIGS. 2A and 10, the second cooking device 1000 may have a greater width (in the x-direction) when compared with the first cooking device 200. However, positioning of the wood pellet reservoir 1026 on the outer side surface 1028 may make available a volume between the lower housing portion 222 and a bottom surface 1024 of the frame 218. In some embodiments, the second cooking device 1000 may omit the frame 218.

Figure 11A:
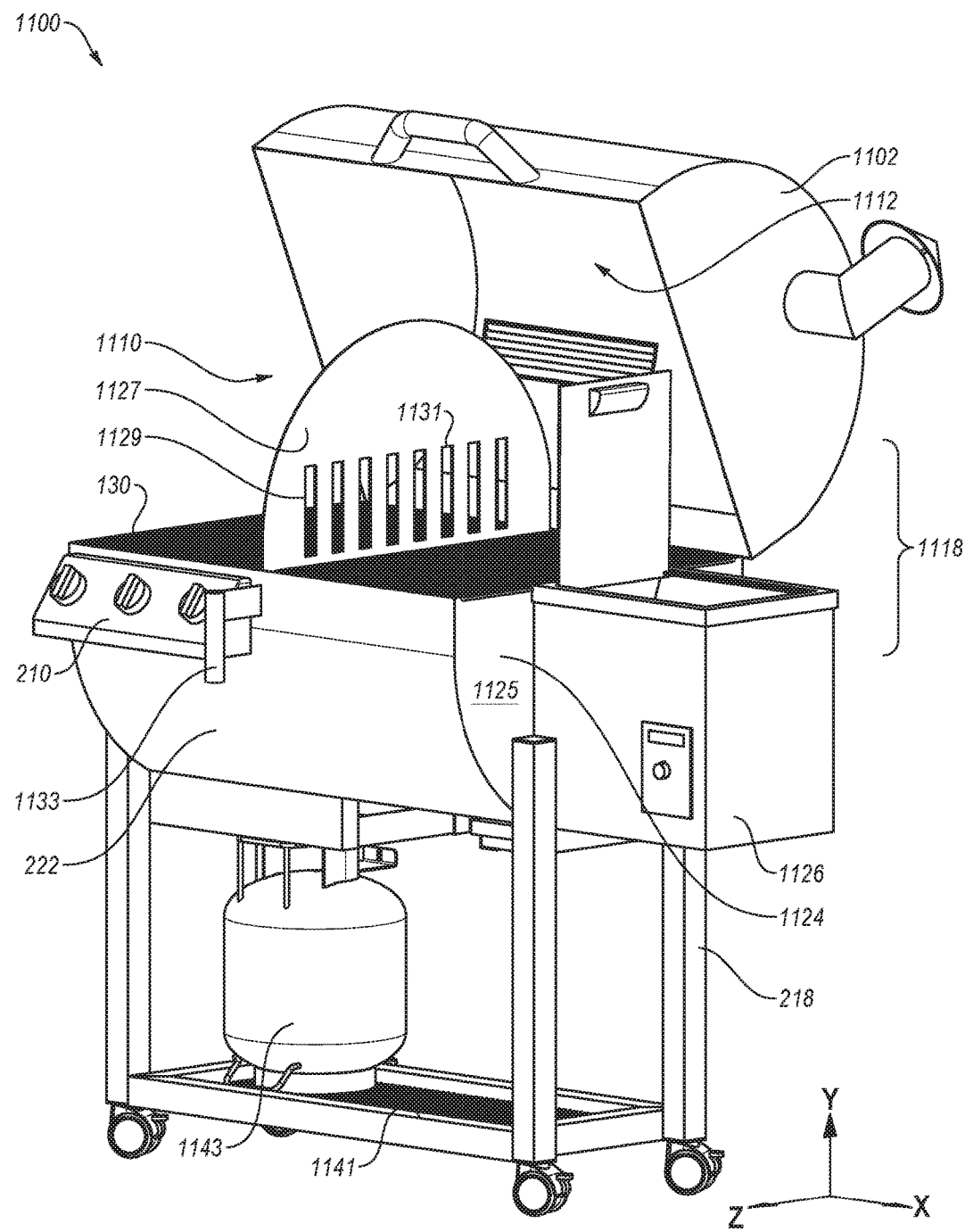
FIG. 11A illustrates a third embodiment of the cooking device of FIG. 1.
Figure 11B:
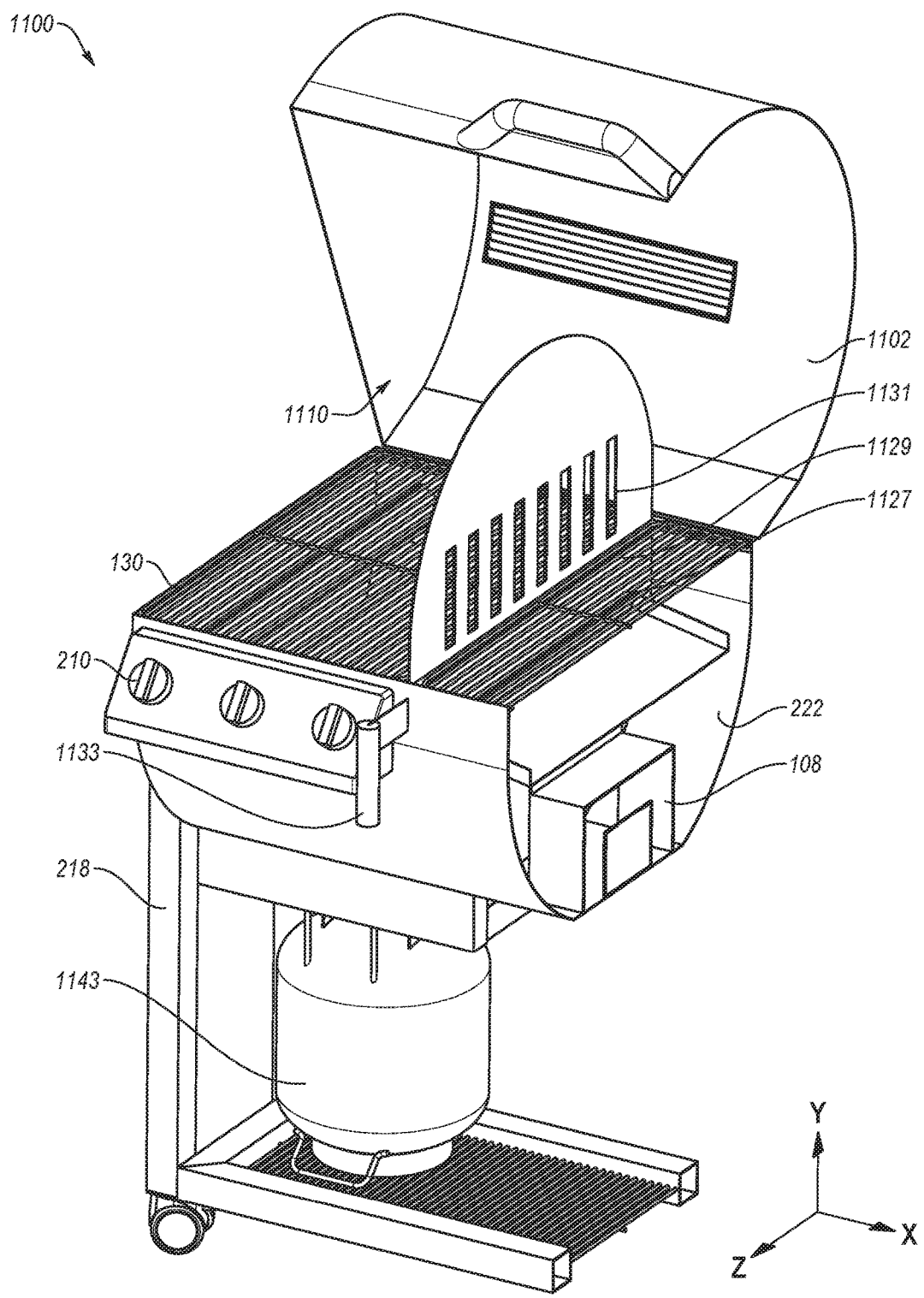
FIG. 11B illustrates a sectional view of the cooking device of FIG. 11A.

FIGS. 11A and 11B illustrates a third embodiment of the cooking device (third cooking device) 1100. FIG. 11A is a perspective view of the third cooking device 1100 with a lid 1102 in an open position. FIG. 11B is a sectional view of the third cooking device 1100 with the lid 1102 in the open position. The third cooking device 1100 includes a duel-fuel source cooking device similar to the cooking devices 200 and 1000 described elsewhere in the present disclosure. In addition, the third cooking device 1100 operates similarly to the cooking devices 200 and 1000 described above. For example, the third cooking device 1100 includes two cooking volumes 1110 and 1112 (FIG. 11A) and two heat sources in a side-by-side arrangement. The heat sources of the third cooking device 1100 may include the heat sources 106 and 108 described above. In particular, the first heat source 106 may provide direct heat and a second heat source 108 may provide indirect heat.

The heat sources may be at least partially positioned within a housing assembly 1118 that includes the lid 1102 and a lower housing portion 1124. A portion of the lid 1102 and a portion of the lower housing portion 1124 may define the first cooking volume 1110 and another portion of the lid 1102 and another portion or a remaining portion of the lower housing portion 1124 may define the second cooking volume 1112.

In the depicted embodiment, the third cooking device 1100 may include a second separator 1127 that may include a vertical vent assembly 1129. The second separator 1127 may extend from the cooking structure 130 towards the lid 1102. For example, the second separator 1127 may include an arced structure, which may correspond to a shape or dimension of the lid 1102.

The second separator 1127 may include multiple substantially rectangular apertures 1131. The rectangular apertures 1131 may be spaced along a width of the second separator 1127. The vertical vent assembly 1129 is disposed on the second separator 1127. The vertical vent assembly 1129 may include multiple rectangular apertures that may correspond to the rectangular apertures 1131 of the second separator 1127. The vertical vent assembly 1129 may include a second positioning mechanism 1133. The second positioning mechanism 1133 may extend from the third cooking device 1100. Accordingly, the position of the vent assembly 1129 relative to the second separator 1127 may be adjusted with the lid 1102 in the closed position. For instance, in the depicted embodiment, a user may pull the second positioning mechanism 1133 away from the lower cooking portion 222 (in the z-direction) or push the second positioning mechanism 1133 towards the lower housing portion 222.

With reference to FIG. 11B, the second separator 1127 is configured to separate the cooking volumes 1110 and 1112. The vent assembly 1129 is configured to selectively enable mixing of gases, fluids, smoke, thermal energy, or some combination thereof between the cooking volumes 1110 and 1112. In the embodiment of FIGS. 11A and 11B, the mixing occurs primarily in the upper portions of the cooking volumes 1110 and 1112. For instance, the second separator 1127 may extend to an inner surface of the lower housing portion 222. Thus, the second separator 1127 may physically separate lower portions of the cooking volumes 1110 and 1112 and mixing of heat and gases in the lower portions of the cooking volumes 1110 and 1112 may be limited.

The second separator 1127 may enable a user to operate the two cooking volumes 1110 and 1112 independently and concurrently as described above. For instance, the user may sear a foodstuffs (e.g., 104) in the first cooking volume 1110. Following a period of searing (e.g., three to four minutes), the vent assembly 1129 may be arranged to allow smoke and/or low-heat air from the second heat source to enter the first cooking volume 1110. In this example, the foodstuffs may be left in the first cooking volume 1110 and the lid 1102 may remain in the closed position.

In some embodiments, the second separator 1127 may not extend an entire distance to the lid 1102. Additionally, in some embodiments, the second separator 1127 may not extend to the inner surface of the lower housing portion 222. In these and other embodiments, the second separator 1127 may be selectively attached to the cooking structure 130.

In addition, the third cooking device 1100 may include the first heat control system 210, the second heat control system 212, and the frame 218. As described above, the heat control systems 210 and 212 may be used to control the amount of thermal energy generated by the first and second heat sources. Additionally, the frame 218 may retain the housing assembly 1118 relative to an environmental surface such as the ground, a deck, etc. The third cooking device 1100 may omit the frame.

Additionally, in the third cooking device 1100 of FIGS. 11A and 11B, a wood pellet reservoir 1126 is positioned on an outer side surface 1125 of the lower housing portion 1124. In these embodiments, an auger mechanism may move wood pellets laterally (in a negative x-direction). In other embodiments, the wood pellet reservoir 1126 may be positioned between the lower housing portion 1124 and a bottom surface 1141 of the frame 218. For instance, the wood pellet reservoir 1126 may be positioned next to a tank 1143.

Figure 12A:
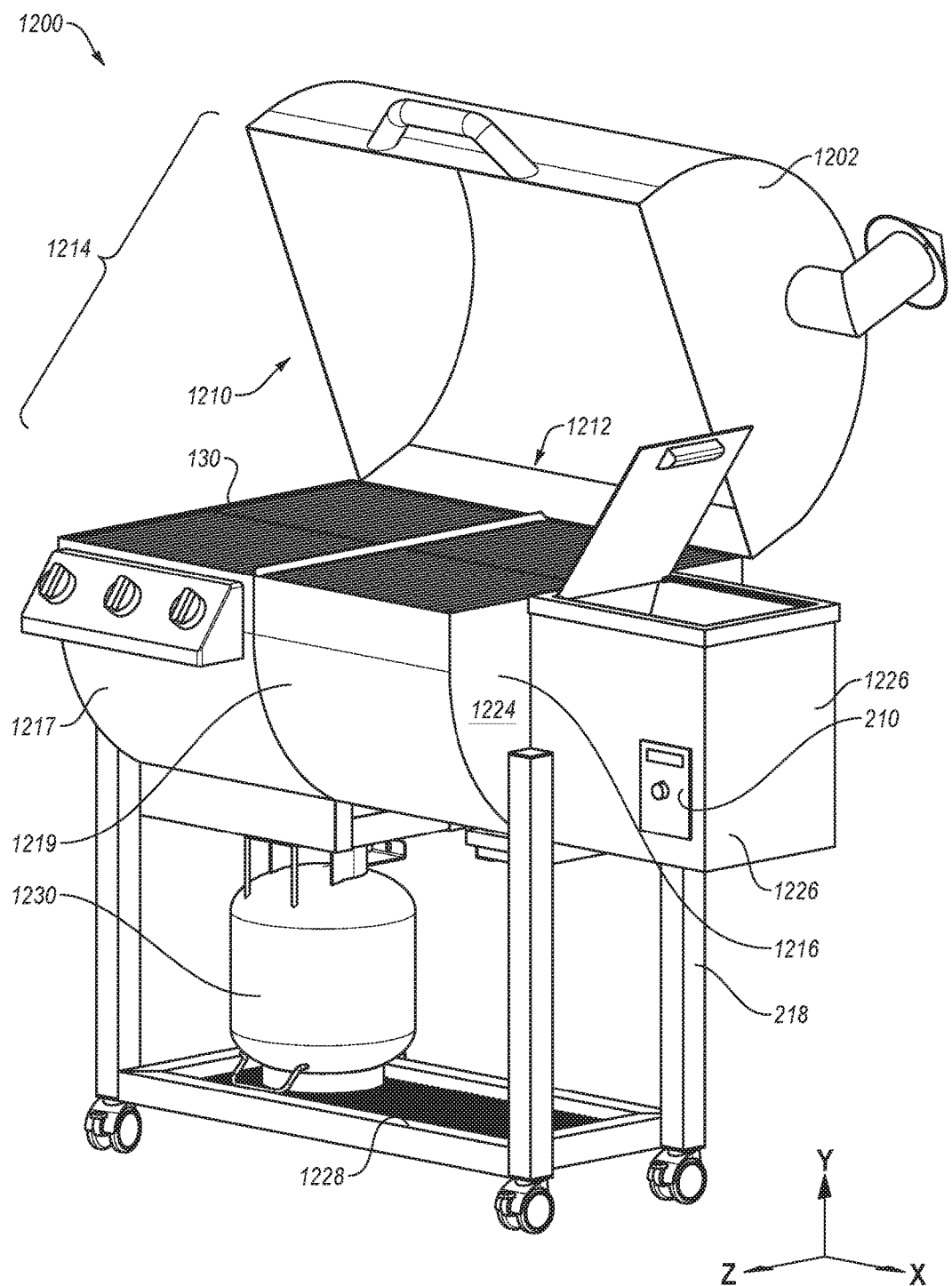
FIG. 12A illustrates a third embodiment of the cooking device of FIG. 1.
Figure 12B:
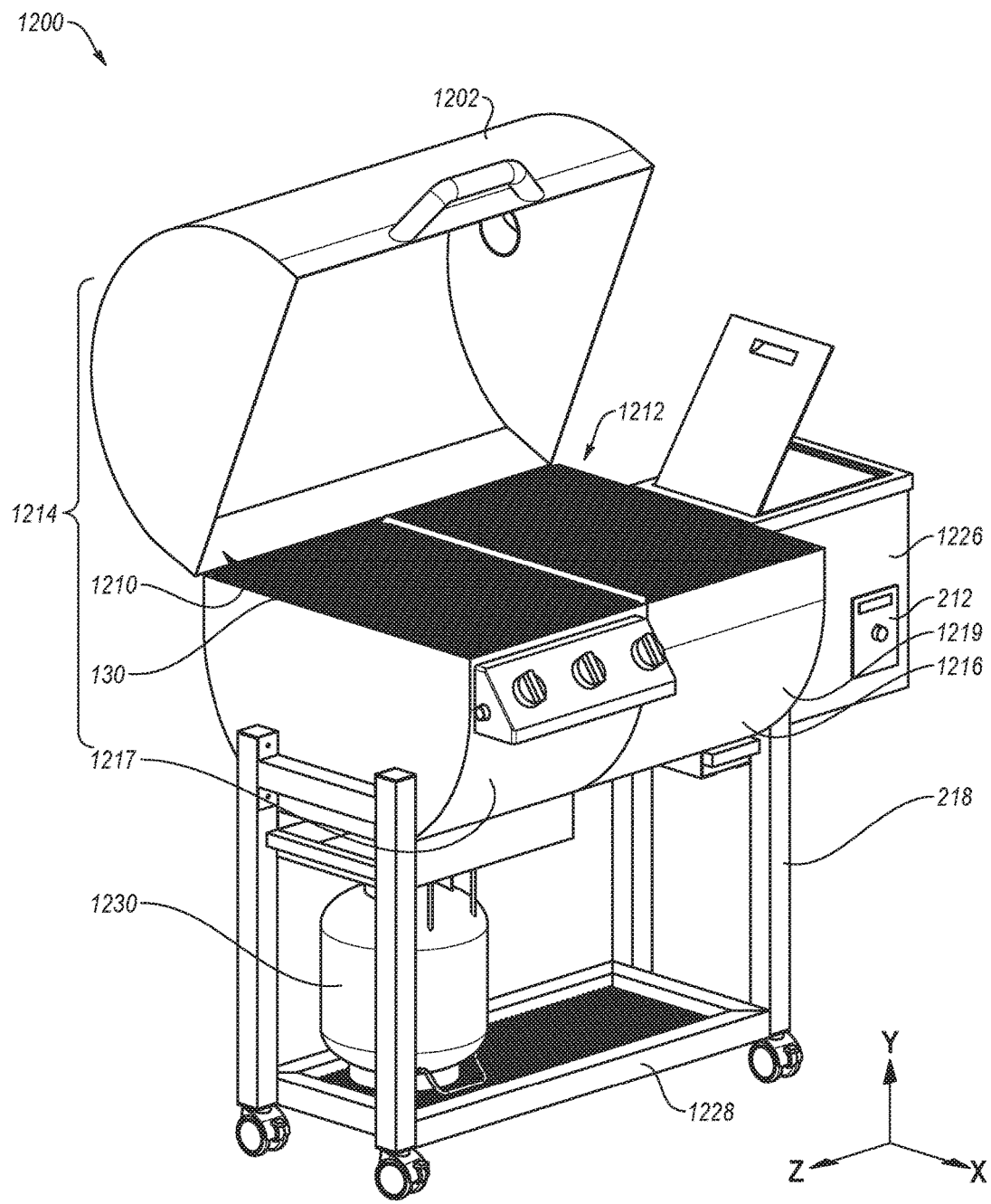
FIG. 12B illustrates a sectional view of the cooking device of FIG. 12A.

FIGS. 12A and 12B illustrate a fourth embodiment of the cooking device (fourth cooking device) 1200. FIG. 12A is a view of the fourth cooking device 1200 with a lid 1202 in an open position. FIG. 12B is another view of the fourth cooking device 1200 with the lid 1202 in the open position.

The fourth cooking device 1200 includes a duel-fuel source cooking device similar to the cooking devices 200, 1000, and 1100 elsewhere in the present disclosure. In addition, the fourth cooking device 1200 operates similarly to the cooking devices 200, 1000, and 1100 described above. For example, the fourth cooking device 1200 includes two cooking volumes 1210 and 1212 and two heat sources in a side-by-side arrangement. The heat sources of the fourth cooking device 1200 may include the heat sources 106 and 108 described above. In particular, the first heat source 106 may provide direct heat and a second heat source 108 may provide indirect heat.

The heat sources may be at least partially positioned within a housing assembly 1214 that includes the lid 1202 and a lower housing portion 1216. A portion of the lid 1202 and a portion of the lower housing portion 1216 may define the first cooking volume 1210 and another portion of the lid 1201 and another portion or a remaining portion of the lower housing portion 1308 may define the second cooking volume 1312.

In the depicted embodiment, the fourth cooking device 1200 does not include a separator and a vent assembly. Instead of the lid 202 with the separator 204 as in the first cooking device 200, the fourth cooking device 1200 includes the lid 1202 absent the separator. Accordingly, mixing (e.g., thermal, fluid, particle mixing) between the first and second cooking volumes 1210 and 1212 above the cooking structure 130 may occur without restriction. A user may operate the two cooking volumes 1210 and 1212 as essentially one cooking volume with two types of heat. For instance, the user may sear a foodstuffs (e.g., 104) in a first cooking volume 1310. Following a period of searing (e.g., three to four minutes), the foodstuffs may be transferred to the second cooking volume 1212, which has been operated at a similar temperature, but not be subject to the direct heat. In particular, the heat provided in the second cooking volume 1212 may be occluded by at least one structure, which may reduce or eliminate the high-heat, direct cooking operations.

The arrangement of the fourth cooking device 1200 improves over cooking devices with a single heat source. For instance, in some conventional cooking devices gas grills are arranged across an entire cooking structure. For indirect cooking, two or three of the grill burners are just turned off, while the others heat the cooking volume. The foodstuff is placed over the portion of the cooking structure below which the burners that are turned off are located. Such an arrangement reduces efficiency of the cooking device because the entire cooking volume is heated by the burners that remain operational. Additionally, such arrangement may cause hotspots, which may require a user to rotate or turn the foodstuffs more frequently to avoid uneven cooking.

In contrast, in the fourth cooking device 1200 enables indirect heating at least partially from below the foodstuffs. The first heat source, which is the direct heat source, (e.g., 106) may be altered to operate a lower temperature (or placed in an off operational state). Thus, at least a portion of the thermal energy used to indirectly cook the foodstuff may be indirect, yet may originate below the foodstuffs. A contribution of the total thermal energy by the second heat source may reduce operation of the first heat source and may reduce hotspots around the foodstuffs.

In some embodiments, a separator or a wall may be included between portions of the lower housing portion 1216. For example, the fourth cooking device 1200 may include direct lower housing portion 1217 and an indirect lower housing portion 1219. The direct lower housing portion 1217 may contain the first heat source (e.g., 106). The indirect lower housing portion 1219 may contain the second heat source (e.g., 108). A wall may be positioned between the direct lower housing portion 1217 and the indirect lower housing portion 1219. The wall may extend from the cooking structure 130 in a y-direction towards a structure of the lower housing portion 1216. In some embodiments, the wall may include a vent, which may be adjustable.

In addition, the fourth cooking device 1200 may include the first heat control system 210, the second heat control system 212, and the frame 218. As described above, the heat control systems 210 and 212 may be used to control the amount of thermal energy generated by the first and second heat sources. Additionally, the frame 218 may retain the housing assembly 1214 relative to an environmental surface such as the ground, a deck, etc. The fourth cooking device 1200 may omit the frame.

Additionally, in the fourth cooking device 1200 of FIGS. 12A and 12B, a wood pellet reservoir 1226 is positioned on an outer side surface 1224 of the lower housing portion 1216. In these embodiments, an auger mechanism may move wood pellets laterally (in a negative x-direction). In other embodiments, the wood pellet reservoir 1226 may be positioned between the lower housing portion 1216 and a bottom surface 1228 of the frame 218. For instance, the wood pellet reservoir 1226 may be positioned next to a tank 1230.

Figure 13A:
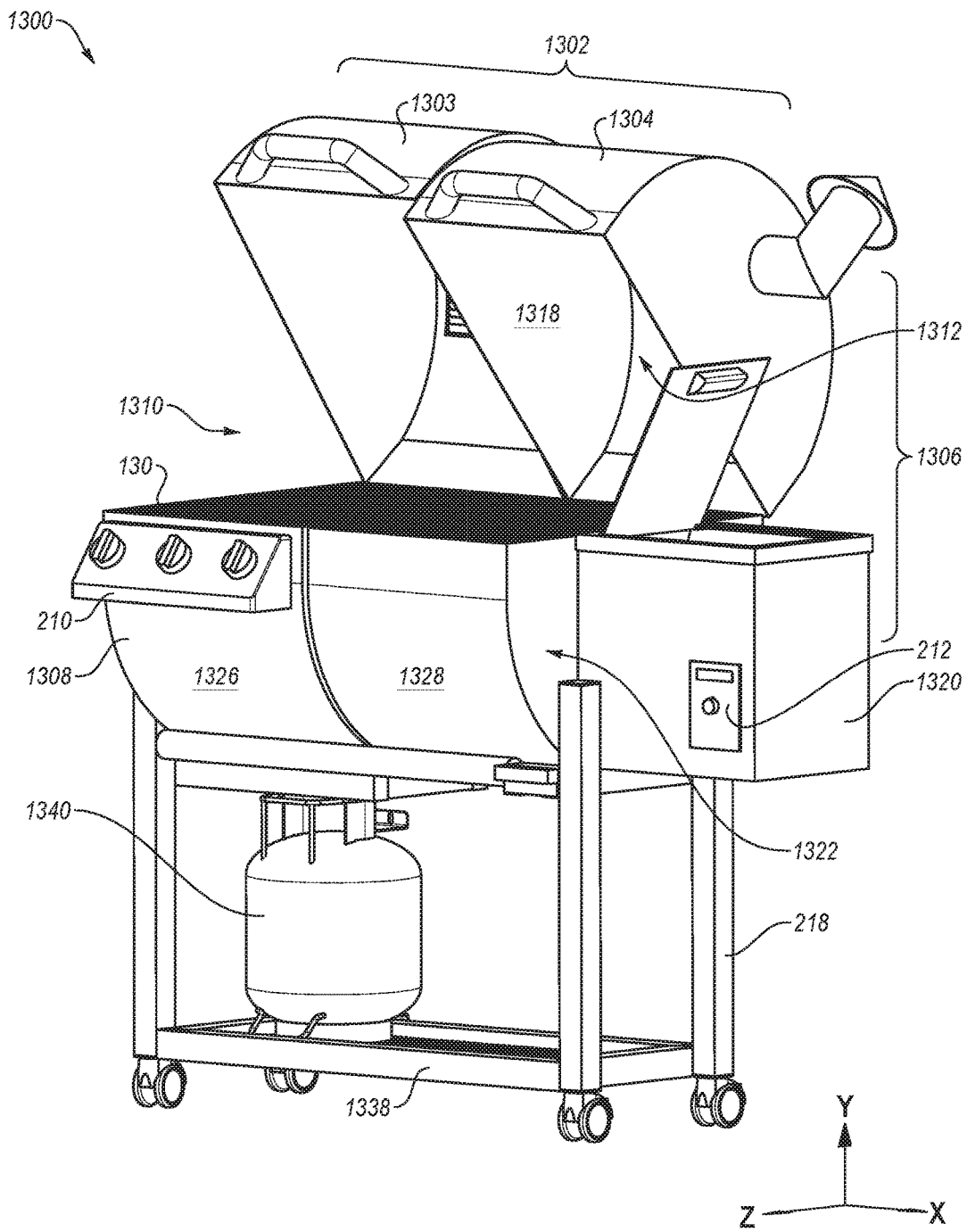
FIG. 13A illustrates a third embodiment of the cooking device of FIG. 1.
Figure 13B:
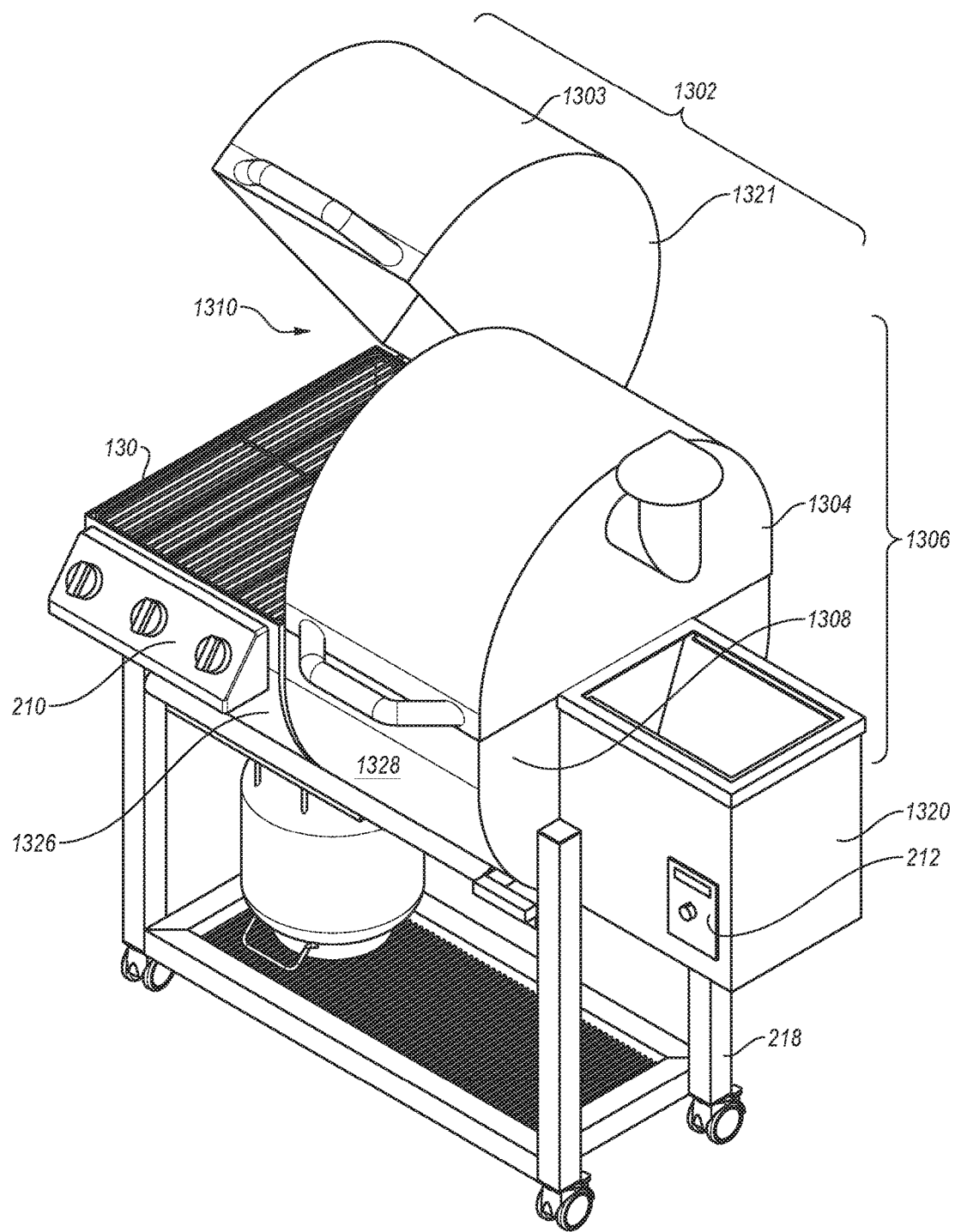
FIG. 13B illustrates a sectional view of the cooking device of FIG. 13A, all in accordance with at least one embodiment described in the present disclosure.

FIGS. 13A and 13B illustrates a fifth embodiment of the cooking device (fifth cooking device) 1300. FIG. 13A is a view of the fifth cooking device 1300 with a lid assembly 1302 in an open position. FIG. 13B illustrates the fifth cooking device 1300 with a second lid 1304 of the lid assembly 1302 in a closed position and a first lid 1303 of the lid assembly 1302 in the open position.

The fifth cooking device 1300 includes a duel-fuel source cooking device similar to the cooking devices 200, 1000, 1100, and 1200 described elsewhere in the present disclosure. In addition, the fifth cooking device 1300 operates similarly to the cooking devices 200, 1000, 1100, and 1200 described above. For example, the fifth cooking device 1300 includes two cooking volumes 1310 and 1312 (FIG. 13A) and two heat sources in a side-by-side arrangement. The heat sources of the fifth cooking device 1300 may include the heat sources 106 and 108 described above. In particular, the first heat source 106 may provide direct heat and a second heat source 108 may provide indirect heat.

The heat sources may be at least partially positioned within a housing assembly 1306 that includes the first lid 1303, the second lid 1304, and a lower housing portion 1308. The first lid 1303 and a portion of the lower housing portion 1308 may define the first cooking volume 1310 and the second lid 1304 and another portion or a remaining portion of the lower housing portion 1308 may define the second cooking volume 1312.

In the depicted embodiment, the fifth cooking device 1300 does not include a separator and a vent assembly between the cooking volumes 1310 and 1312. For instance, with combined reference to FIG. 13A and FIG. 2A, the first cooking device 200 includes the separator 204 and the vent assembly 214. The separator 204 is configured to separate the cooking volumes 112A and 112B and the vent assembly 214 is configured to selectively enable mixing of gases, fluids, smoke, energy or some combination thereof between the cooking volumes 112A and 112B. Instead of the lid 202 with the separator 204, the fifth cooking device 1300 includes two separate lids, 1303 and 1304. The lids 1303 and 1304 each include a central wall. For instance, the second lid 1304 includes a first central wall 1318 (FIG. 13A) and the first lid 1303 includes a first central wall 1321 (FIG. 13B). The central walls 1318 and 1321 restrict or prevent mixing between the cooking volumes 1310 and 1312. Accordingly, with the lids 1303 and 1304 in the closed position, mixing between the first cooking volume 1310 and the second cooking volume 1312 may be substantially prevented. A user may operate the two cooking volumes 1310 and 1312 independently. For instance, the user may smoke a foodstuffs (e.g., 104) in the second cooking volume 1312. Following a period of smoking (e.g., three to four hours), the foodstuffs may be transferred to the first cooking volume 1310, which has been operated to an elevated temperature. The foodstuffs may be "finished" on a portion of the cooking structure 130 in the first cooking volume 1310. Accordingly, in the fifth cooking device 1300, the first cooking volume 1310 may be implemented to provide direct heat to the foodstuffs and the second cooking volume 1312 may be implemented to provide indirect heat to the foodstuffs.

In some embodiments, a separator or a wall may be included between portions of the lower housing portion 1308. For example, the fifth cooking device 1300 may include direct lower housing portion 1326 and an indirect lower housing portion 1328. The direct lower housing portion 1326 may contain the first heat source (e.g., 106). The indirect lower housing portion 1328 may contain the second heat source (e.g., 108). A wall may be positioned between the direct lower housing portion 1326 and the indirect lower housing portion 1328. The wall may extend from the cooking structure 130 in a y-direction towards a structure of the lower housing portion 1308. In some embodiments, the wall may include a vent, which may be adjustable. In the depicted embodiment, the direct lower housing portion 1326 and the indirect lower housing portion 1328 may each include about half of a width (a dimension in the x-direction) of the lower housing portion 1308. In other embodiments, two-thirds of the width (a dimension in the x-direction), one-fourth of the width, three-fourths of the width, or another suitable fraction of the width may be utilized by the direct lower housing portion 1326 or the indirect lower housing portion 1328.

In addition, the fifth cooking device 1300 may include the first heat control system 210, the second heat control system 212, and the frame 218. As described above, the heat control systems 210 and 212 may be used to control the amount of thermal energy generated by the first and second heat sources. Additionally, the frame 218 may retain the housing assembly 1306 relative to an environmental surface such as the ground, a deck, etc. The fifth cooking device 1300 may omit the frame.

Additionally, in the fifth cooking device 1300 of FIGS. 13A and 13B a wood pellet reservoir 1320 is positioned on an outer side surface 1322 of the lower housing portion 1308. In these embodiments, an auger mechanism may move wood pellets laterally (in a negative x-direction). In other embodiments, the wood pellet reservoir 1320 may be positioned between the lower housing portion 1308 and a bottom surface 1338 of the frame 218. For instance, the wood pellet reservoir 1320 may be positioned next to a tank 1340.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A cooking device comprising:
    a housing assembly at least partially comprised of a lid, the housing assembly defining two cooking volumes positioned in a side-by-side arrangement, a first cooking volume of the two cooking volumes having a first portion of a cooking structure arranged for placement of a foodstuff and a second cooking volume of the two cooking volumes having a second portion of the cooking structure, the lid dimensioned to cover both of the two cooking volumes in a closed position;
    a separator positioned between the first cooking volume and the second cooking volume to at least partially define a physical boundary therebetween, the separator including an upper separator portion disposed between the first and second portions of the cooking structure and the lid, and a lower separator portion that is disposed between the first and second portions of the cooking structure and a lower portion of the housing assembly, the upper separator portion or the lower separator portion defining a first plurality of apertures;
    a vent assembly disposed one of the upper separator portion or the lower separator portion, the vent assembly being configured to selectively enable fluid communication between the first cooking volume and the second cooking volume, the vent assembly including a vent plate defining a second plurality of apertures and a positioning mechanism that extends from the housing assembly such that the vent plate is movable relative to the separator to align or misalign the first plurality of apertures with the second plurality of apertures when the lid is in the closed position;
    a first heat source including a gas grill, the first heat source being disposed in the first cooking volume and being positioned relative to the first portion of the cooking structure to provide thermal energy directly to the first portion of the cooking structure; and
    a second heat source including a wood pellet burner, the second heat source being disposed in the second cooking volume, the second heat source being occluded from the second portion of the cooking structure by a diffuser structure such that the second heat source is configured to provide thermal energy indirectly to the second portion of the cooking structure,
    wherein the first heat source and the second heat source are configured to operate both independently and cooperatively to allow for selective cooking of a foodstuff on the first portion of the cooking structure or the second portion of the cooking structure with both direct thermal energy from the first heat source and indirect thermal energy from the second heat source.

2. The cooking device of claim 1, wherein the housing assembly includes a single integrated outer structure that defines the two cooking volumes.

3. The cooking device of claim 2, wherein:
    the single integrated outer structure defines a cross-sectional area between the first cooking volume and the second cooking volume; and
    the separator includes a substantially planar structure that substantially corresponds to the cross-sectional area of the single integrated outer structure.

4. The cooking device of claim 1, wherein the vent assembly is configurable in a closed position, a partially open position, and an open position from an environment external to the housing assembly.

5. The cooking device of claim 1, wherein the second heat source is a different type than the first heat source.

6. The cooking device of claim 1, further comprising a wood pellet reservoir, wherein the wood pellet burner is feedable via an automatic pellet feed subsystem that draws pellets from the wood pellet reservoir.

7. The cooking device of claim 6, wherein:
    the wood pellet reservoir is disposed on a side of the second cooking volume; or
    the wood pellet reservoir is disposed in a vertical arrangement relative to the second cooking volume.

8. A duel-fuel source cooking device, the duel-fuel source cooking device comprising:
    a housing assembly at least partially defining two cooking volumes positioned in a side-by-side arrangement, the housing assembly including:
        a lower housing portion that defines lower volumes of the two cooking volumes;
        a lid rotatably attached to the lower housing portion, the lid being dimensioned to cover the lower volumes of the two cooking volumes in a closed position;
    a first heat source including a low-pressure gas grill disposed in a first cooking volume of the two cooking volumes, the first heat source being positioned relative to a first portion of a cooking structure to provide thermal energy directly to the first portion of the cooking structure;
    a second heat source including a wood pellet burner that is disposed in a second cooking volume of the two cooking volumes, the second heat source being occluded from a second portion of the cooking structure by a diffuser structure such that the second heat source is configured to provide thermal energy indirectly to the second portion of the cooking structure;
    an upper separator portion disposed between the first and second portions of the cooking structure and the lid;
    a lower separator portion disposed between the first and second portions of the cooking structure and a lower portion of the housing assembly, the upper separator portion or the lower separator portion defining a first plurality of apertures;
    a vent assembly disposed one of the upper separator portion or the lower separator portion, the vent assembly including a vent plate defining a second plurality of apertures and a positioning mechanism that protrudes from the housing assembly such that the vent plate is movable to align or misalign the first plurality of apertures with the second plurality of apertures when the lid is in the closed position; and
    wherein the first heat source and the second heat source are configured to operate both independently and cooperatively to allow for selective cooking of a foodstuff on the first portion of the cooking structure or the second portion of the cooking structure with both direct thermal energy from the first heat source and indirect thermal energy from the second heat source.

9. The duel-fuel source cooking device of claim 8, further comprising:
the upper separator portion and the lower separator portion at least partially define a physical boundary between the first cooking volume and the second cooking volume.

10. The duel-fuel source cooking device of claim 9, wherein the lid and the lower housing portion comprise a single integrated outer structure.

11. The duel-fuel source cooking device of claim 10, wherein:
the single integrated outer structure defines a cross-sectional area between the first cooking volume and the second cooking volume; and
the upper separator portion and the lower separator portion include a substantially planar structure that substantially corresponds to the cross-sectional area.

12. The duel-fuel source cooking device of claim 8, wherein
the upper separator portion is attached to the lid.

13. The duel-fuel source cooking device of claim 8, further comprising a wood pellet reservoir, wherein:
the wood pellet reservoir is mechanically coupled to the housing assembly; and
the wood pellet burner is feedable via an automatic pellet feed subsystem that draws pellets from the wood pellet reservoir.

14. The cooking device of claim 1, wherein:
the first plurality of apertures are rotationally offset relative to one another;
the vent plate rotates relative to the upper separator portion and the lower separator portion to transition the vent assembly from an open position to a closed position; and
the positioning mechanism extends from the lid.

15. The cooking device of claim 1, wherein:
the first plurality of apertures are laterally offset relative to one another;
the vent plate translates relative to the upper separator portion and the lower separator portion to transition the vent assembly from an open position to a closed position; and
the positioning mechanism extends from the lower housing.

16. The duel-fuel source cooking device of claim 8, wherein:
the first plurality of apertures are rotationally offset relative to one another;
the vent plate rotates relative to the upper separator portion and the lower separator portion to transition the vent assembly from an open position to a closed position; and
the positioning mechanism extends from the lid.

17. The duel-fuel source cooking device of claim 8, wherein:
the first plurality of apertures are laterally offset relative to one another;
the vent plate translates relative to the upper separator portion and the lower separator portion to transition the vent assembly from an open position to a closed position; and
the positioning mechanism extends from the lower housing.

18. The cooking device of claim 1, further comprising:
a frame that is attached to the lower housing portion, the frame retaining the housing assembly relative to an environmental surface; and
another vent assembly disposed on the other of the upper separator portion or the lower separator portion.

19. The duel-fuel source cooking device of claim 8, further comprising:
a frame that is attached to the lower housing portion, the frame retaining the housing assembly relative to an environmental surface; and
another vent assembly disposed on the other of the upper separator portion or the lower separator portion.

* * * * *